(12) United States Patent
Saitoh et al.

(10) Patent No.: US 11,460,729 B2
(45) Date of Patent: Oct. 4, 2022

(54) OPTICAL ELEMENT AND SENSOR

(71) Applicant: FUJIFILM Corporation, Tokyo (JP)

(72) Inventors: Yukito Saitoh, Minami-ashigara (JP); Hiroshi Sato, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/158,761

(22) Filed: Jan. 26, 2021

(65) Prior Publication Data
US 2021/0149248 A1   May 20, 2021

Related U.S. Application Data

(63) Continuation of application No. PCT/JP2019/029226, filed on Jul. 25, 2019.

(30) Foreign Application Priority Data

Jul. 27, 2018   (JP) .............................. JP2018-141370

(51) Int. Cl.
| | |
|---|---|
| *G02F 1/1335* | (2006.01) |
| *G01D 5/26* | (2006.01) |
| *G02F 1/137* | (2006.01) |

(52) U.S. Cl.
CPC ......... *G02F 1/133543* (2021.01); *G01D 5/26* (2013.01); *G02F 1/13718* (2013.01); *G02F 1/133541* (2021.01)

(58) Field of Classification Search
CPC ......... G02F 1/133543; G02F 1/133541; G02F 1/13718; G01D 5/26
See application file for complete search history.

(56) References Cited

U.S. PATENT DOCUMENTS

| | | |
|---|---|---|
| 2003/0090618 A1 | 5/2003 | Kashima |
| 2006/0131522 A1 | 6/2006 | Choi et al. |
| | (Continued) | |

FOREIGN PATENT DOCUMENTS

| | | |
|---|---|---|
| JP | 2002-189124 A | 7/2002 |
| JP | 2006-113513 A | 4/2006 |
| | (Continued) | |

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2019/029226, dated Feb. 11, 2021.
(Continued)

*Primary Examiner* — Nathanael R Briggs
(74) *Attorney, Agent, or Firm* — Birch, Stewart, Kolasch & Birch, LLP

(57) ABSTRACT

Provided are a novel optical element that can be used as a sensor or the like and a sensor including the same optical element. The optical element includes a cholesteric liquid crystal layer, in which the cholesteric liquid crystal layer has a liquid crystal alignment pattern in which a direction of an optical axis derived from a liquid crystal compound changes while continuously rotating in at least one in-plane direction, and in a case where a cross-section taken in a thickness direction conforming the in-plane direction in which the direction of the optical axis rotates is observed using a scanning electron microscope, a portion where a bright line and a dark line derived from the cholesteric liquid crystalline phase are discontinuous is provided in the cholesteric liquid crystal layer in the in-plane direction in which the direction of the optical axis rotates.

15 Claims, 11 Drawing Sheets

(56) References Cited

U.S. PATENT DOCUMENTS

| | | |
|---|---|---|
| 2013/0027656 A1 | 1/2013 | Escuti et al. |
| 2016/0169664 A1 | 6/2016 | Hayashi et al. |
| 2018/0164480 A1* | 6/2018 | Yoshida .................. G02B 5/10 |
| 2021/0341767 A1* | 11/2021 | Wang .................... G02F 1/0072 |

FOREIGN PATENT DOCUMENTS

| | | |
|---|---|---|
| JP | 2014-528597 A | 10/2014 |
| WO | WO 2015/030176 A1 | 3/2015 |
| WO | WO 2016/194961 A1 | 12/2016 |

OTHER PUBLICATIONS

International Search Report (Form PCT/ISA/210) for International Application No. PCT/JP2019/029226, dated Oct. 8, 2019, with English translation.

Japanese Notice of Reasons for Refusal for corresponding Japanese Application No. 2020-532467, dated Oct. 12, 2021, with an English translation.

\* cited by examiner

OPTICAL ELEMENT AND SENSOR

CROSS-REFERENCE TO RELATED APPLICATIONS

This application is a Continuation of PCT International Application No. PCT/JP2019/029226 filed on Jul. 25, 2019, which claims priority under 35 U.S.C. § 119(a) to Japanese Patent Application No. 2018-141370 filed on Jul. 27, 2018. The above application is hereby expressly incorporated by reference, in its entirety, into the present application.

BACKGROUND OF THE INVENTION

1. Field of the Invention

The present invention relates to an optical element that reflects light and a sensor that is formed of the optical element.

2. Description of the Related Art

Various optical elements including a cholesteric liquid crystal layer that is obtained by immobilizing a cholesteric liquid crystalline phase have been proposed.

The cholesteric liquid crystal layer has wavelength selectivity in reflection and reflects only circularly polarized light in a specific twisted direction. That is, for example, the cholesteric liquid crystal layer reflects only right circularly polarized light of red light and allows transmission of the other light.

By using the cholesteric liquid crystal layer, for example, a transparent projection screen through which an opposite side can be seen can be realized.

Light reflection by the cholesteric liquid crystal layer is specular reflection. For example, light incident into a cholesteric liquid crystal layer from a normal direction (front side) is reflected in the normal direction of the cholesteric liquid crystal layer.

On the other hand, WO2016/194961A describes a reflective structure including a cholesteric liquid crystal layer, in which light can be reflected with an angle in a predetermined direction with respect to specular reflection instead of specular reflection.

This reflective structure includes a plurality of helical structures each of which extends in a predetermined direction. In addition, this reflective structure includes: a first incidence surface that intersects the predetermined direction and into which light is incident; and a reflecting surface that intersects the predetermined direction and reflects the light incident from the first incidence surface, in which the first incidence surface includes one of two end portions in each of the plurality of helical structures. In addition, each of the plurality of helical structures includes a plurality of structural units that lies in the predetermined direction, and each of the plurality of structural units includes a plurality of elements that are helically twisted and laminated. In addition, each of the plurality of structural units includes a first end portion and a second end portion, the second end portion of one structural unit among structural units adjacent to each other in the predetermined direction forms the first end portion of the other structural unit, and alignment directions of the elements positioned in the plurality of first end portions included in the plurality of helical structures are aligned. Further, the reflecting surface includes at least one first end portion included in each of the plurality of helical structures and is not parallel to the first incidence surface.

SUMMARY OF THE INVENTION

A reflective structure (cholesteric liquid crystal layer) described in WO2016/194961A has a liquid crystal alignment pattern in which a direction of an optical axis derived from the liquid crystal compound changes while continuously rotating in at least one in-plane direction. The cholesteric liquid crystal layer described in WO2016/194961A has the above-described liquid crystal alignment pattern so as to include the reflecting surface that is not parallel to the first incidence surface.

Therefore, the reflective structure described in WO2016/194961A reflects incident light with an angle in the predetermined direction with respect to specular reflection instead of specular reflection. For example, in the cholesteric liquid crystal layer described in WO2016/194961A, light incident from the normal direction is reflected with an angle with respect to the normal direction instead of being reflected in the normal direction.

As a result, in WO2016/194961A, the application range of the reflective structure including the cholesteric liquid crystal layer can be extended.

As shown in WO2016/194961A, various optical elements can be realized by using the cholesteric liquid crystal layer.

An object of the present invention is to provide a novel optical element that reflects light using a cholesteric liquid crystal layer and can be used as a sensor for detecting mechanical stimuli or the like, and a novel sensor including the optical element.

In order to achieve the object, the present invention has the following configurations.

[1] An optical element comprising:

a cholesteric liquid crystal layer that is obtained by immobilizing a cholesteric liquid crystalline phase, in which the cholesteric liquid crystal layer has a liquid crystal alignment pattern in which a direction of an optical axis derived from a liquid crystal compound changes while continuously rotating in at least one in-plane direction, and in a cross-sectional view obtained by observing, using a scanning electron microscope, a cross-section taken in a thickness direction conforming the in-plane direction in which the direction of the optical axis rotates, a portion where a bright line and a dark line derived from the cholesteric liquid crystalline phase are discontinuous is provided in the cholesteric liquid crystal layer in the in-plane direction in which the direction of the optical axis rotates.

[2] The optical element according to [1], in which a portion where angles of the bright line and the dark line are different is provided as the portion where the bright line and the dark line are discontinuous.

[3] The optical element according to [2], in which in the portion where the bright line and the dark line are discontinuous, the bright line and the dark line are directed to the thickness direction of the cholesteric liquid crystal layer.

[4] The optical element according to [2] or [3], in which in liquid crystal compounds facing each other in the thickness direction with respect to the portion where the bright line and the dark line are discontinuous, directions of optical axes derived from the liquid crystal compounds are the same.

[5] The optical element according to claim 1,
wherein a portion where the bright line and the dark line are disconnected is provided as the portion where the bright line and the dark line are discontinuous.

[6] The optical element according to [1],
wherein a portion where the bright line and the dark line are shifted in the in-plane direction in which the direction of the optical axis rotates is provided as the portion where the bright line and the dark line are discontinuous.

[7] The optical element according to [6],
in which in liquid crystal compounds facing each other in the thickness direction with respect to the portion where the bright line and the dark line are discontinuous, directions of optical axes derived from the liquid crystal compounds are different from each other.

[8] The optical element according to [7],
in which in the liquid crystal compounds facing each other in the thickness direction with respect to the portion where the bright line and the dark line are discontinuous, an angle between the optical axes derived from the liquid crystal compounds is 70° to 90°.

[9] The optical element according to any one of [1] to [8],
wherein in a selective reflection wavelength range of the cholesteric liquid crystal layer, in a case where a wavelength having a lowest reflectivity is represented by λm [nm], a thickness [nm] of the portion where the bright line and the dark line are discontinuous is in the following range, 30×(λm/550) to 150×(λm/550).

[10] A sensor comprising:
the optical element according to any one of [1] to [9]; and
a photodetector that detects light reflected from the optical element.

[11] The sensor according to [10], further comprising:
a light source that emits light capable of being reflected from the optical element,
wherein the photodetector detects light emitted from the light source and reflected from the optical element.

[12] The sensor according to [10] or [11],
in which the photodetector is a photodetector that detects light in a line shape or a photodetector that two-dimensionally detects light.

[13] The sensor according to any one of [10] to [12],
in which a stimulus received by the optical element is detected. [14] The sensor according to [13],
in which at least one of a mechanical stimulus, an optical stimulus, a chemical stimulus, or an electrical stimulus is detected as the stimulus received by the optical element.

According to an aspect of the present invention, provided are: a novel optical element that includes a cholesteric liquid crystal layer and can be used as a sensor for detecting mechanical stimuli or the like; and a novel sensor including the optical element.

DESCRIPTION OF THE PREFERRED EMBODIMENTS

Figure 1:
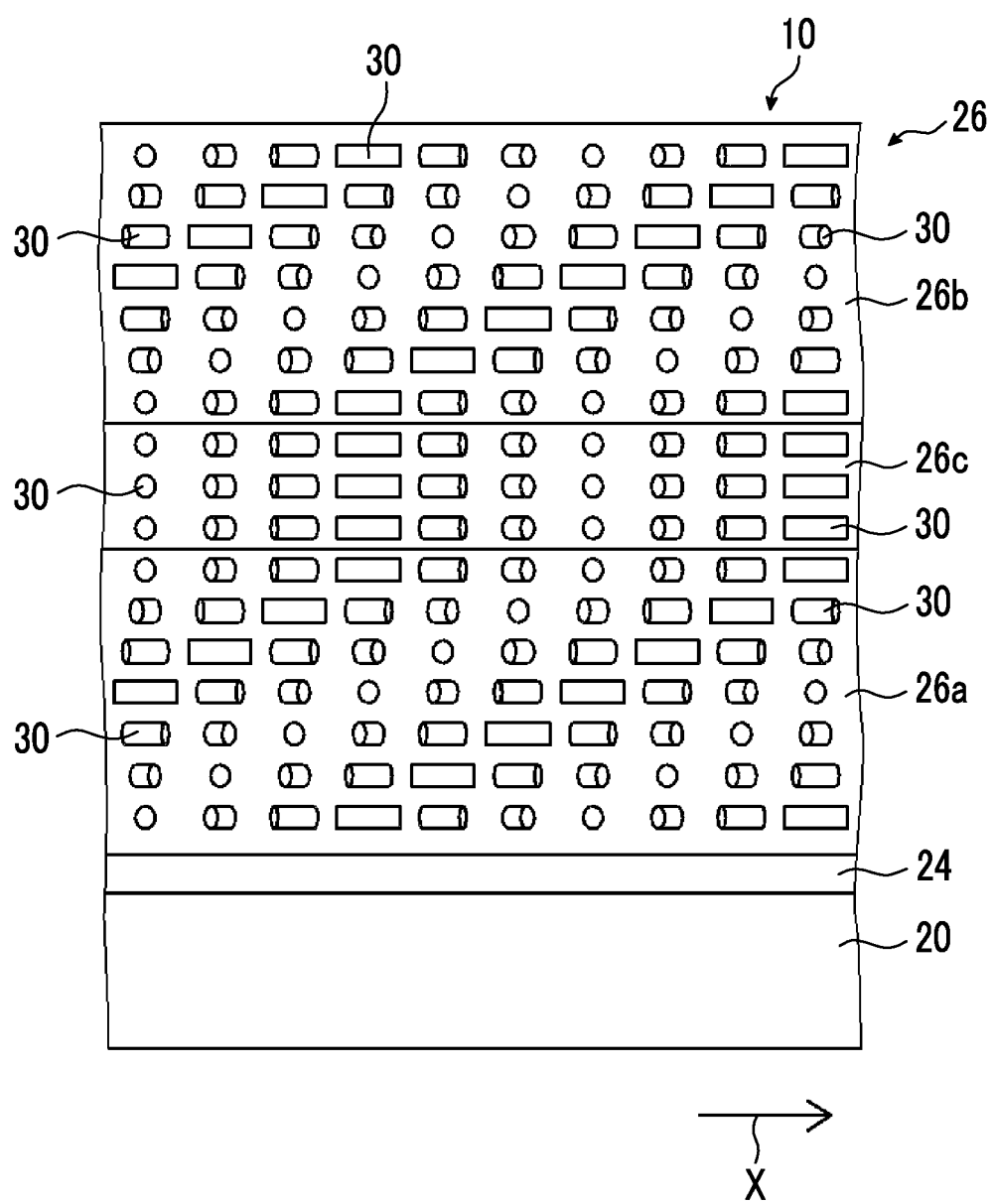
FIG. 1 is a diagram conceptually showing an example of an optical element according to the present invention.

Hereinafter, an optical element and a sensor according to an embodiment of the present invention will be described in detail based on a preferable embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, the meaning of "the same" includes a case where an error range is generally allowable in the technical field. In addition, in the present specification, the meaning of "all", "entire", or "entire surface" includes not only 100% but also a case where an error range is generally allowable in the technical field, for example, 99% or more, 95% or more, or 90% or more.

In the present specification, a selective reflection center wavelength refers to an average value of two wavelengths at which, in a case where a minimum value of a transmittance of a target object (member) is represented by Tmin (%), a half value transmittance: T½ (%) represented by the following expression is exhibited.

Expression for obtaining Half Value Transmittance:
$T\frac{1}{2}=100-(100-T\min)\div2$ <Optical Element>
The optical element according to the embodiment of the present invention is a light reflection element that reflects incident light and includes a cholesteric liquid crystal layer obtained by immobilizing a cholesteric liquid crystalline phase.

In the optical element according to the embodiment of the present invention, the cholesteric liquid crystal layer has a liquid crystal alignment pattern in which a direction of an optical axis derived from a liquid crystal compound changes while continuously rotating in at least one in-plane direction.

In the optical element according to the embodiment of the present invention, in a case where a cross-section taken in a thickness direction conforming the in-plane direction in which the direction of the optical axis rotates is observed using a scanning electron microscope, a portion where a bright line and a dark line derived from the cholesteric liquid crystalline phase are discontinuous is provided in the cholesteric liquid crystal layer in the in-plane direction in which the direction of the optical axis rotates.

Although described below in detail, the optical element according to the embodiment of the present invention is a novel optical element that has the above-described structure such that incident light can be reflected with an angle in the predetermined direction with respect to specular reflection, and a wavelength (wavelength range) at which a reflectivity rapidly decreases is present in a selective reflection wavelength range of the cholesteric liquid crystal layer, and the wavelength where a reflectivity rapidly decreases varies depending on external stimuli. The above-described optical element according to the embodiment of the present invention can be suitably used in a sensor or the like that detects mechanical stimuli or the like.

FIG. 1 is a diagram conceptually showing an example of the optical element according to the embodiment of the present invention.

An optical element 10 shown in the drawing is an optical element that includes a cholesteric liquid crystal layer 26 obtained by immobilizing a cholesteric liquid crystalline phase and selectively reflects light in a specific wavelength range, the optical element 10 including a support 20, an alignment film 24, and a cholesteric liquid crystal layer 26 in this order from the lower part in the drawing.

In addition, the cholesteric liquid crystal layer 26 includes a first region 26a, a second region 26b, and a discontinuous portion 26c. In the cholesteric liquid crystal layer 26, the discontinuous portion 26c is interposed between the first region 26a and the second region 26b. In the cholesteric liquid crystal layer 26, the first region 26a side is the support 20 side.

In the example shown in the drawing, the thickness, size, and the like of each of the layers and the regions are appropriately adjusted in order to clearly show the configuration of the present invention and are different from the actual ones of the optical element according to the embodiment of the present invention.

In addition, in the following description, the support 20 side will also be referred to as "lower side", and the cholesteric liquid crystal layer 26 (second region 26b side) side will also be referred to as "upper side". Accordingly, in the cholesteric liquid crystal layer 26 and the first region 26a, the discontinuous portion 26c, and the second region 26b of the cholesteric liquid crystal layer 26, a surface on the support 20 side will also be referred to as "lower surface", and a surface on the side opposite to the support 20 side will also be referred to as "upper surface".

<<Support>>

In the optical element 10, the support 20 supports the alignment film 24 and the cholesteric liquid crystal layer 26. The optical element according to the embodiment of the present invention does not necessarily include the support 20.

As the support 20, various sheet-shaped materials (films or plate-shaped materials) can be used as long as they can support the alignment film 24 and the cholesteric liquid crystal layer 26.

The support 20 may be transparent or opaque.

The thickness of the support 20 is not particularly limited and may be appropriately set depending on the use of the optical element 10, a material for forming the support 20, and the like in a range where the alignment film 24 and the cholesteric liquid crystal layer 26 can be supported.

The thickness of the support 20 is preferably 1 to 1000 µm, more preferably 3 to 250 µm, and still more preferably 5 to 150 µm.

The support 20 may have a single-layer structure or a multi-layer structure.

In a case where the support 20 has a single-layer structure, examples thereof include supports formed of glass, triacetyl cellulose (TAC), polyethylene terephthalate (PET), polycarbonates, polyvinyl chloride, acryl, polyolefin, and the like. In a case where the support 20 has a multi-layer structure, examples thereof include a support including: one of the above-described supports having a single-layer structure that is provided as a substrate; and another layer that is provided on a surface of the substrate.

<<Alignment Film>>

In the optical element 10, the alignment film 24 is formed on a surface (upper surface) of the support 20.

The alignment film 24 is an alignment film for aligning the liquid crystal compound 30 to a predetermined liquid crystal alignment pattern during the formation of the cholesteric liquid crystal layer 26 (the first region 26a) of the optical element 10.

Although described below, in the optical element 10 according to the embodiment of the present invention, the cholesteric liquid crystal layer 26 (the first region 26a and the second region 26b) has a liquid crystal alignment pattern in which a direction of an optical axis 30A derived from the liquid crystal compound 30 changes while continuously rotating in one in-plane direction (refer to FIG. 3).

In the liquid crystal alignment pattern, a length over which the direction of the optical axis 30A rotates by 180° in the in-plane direction (arrow X direction described below) in which the direction of the optical axis 30A changes while continuously rotating is set as a single period (a rotation period of the optical axis). In a preferable aspect of the optical element 10, the first region 26a and the second region 26b of the cholesteric liquid crystal layer 26 have the same length of the single period in the liquid crystal alignment pattern.

Further, in a preferable aspect of the optical element 10, the first region 26a and the second region 26b of the cholesteric liquid crystal layer 26 have the same rotation direction of the optical axis 30A and the same direction in which the optical axis 30A changes while rotating in the liquid crystal alignment pattern of the cholesteric liquid crystal layer 26.

In the optical element 10 having the above-described configuration, in a case where light having the same color (wavelength) is incident, the first region 26a and the second region 26b of the cholesteric liquid crystal layer 26 reflect the incidence light in the same direction.

In the following description, "the optical axis 30A derived from the liquid crystal compound 30" will also be simply referred to as "the optical axis 30A". In addition, "the direction of the optical axis 30A rotates" will also be simply referred to as "the optical axis 30A rotates".

As the alignment film, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as w-tricosanoic acid, dioctadecylmethylammonium chloride, or methyl stearate.

The alignment film formed by a rubbing treatment can be formed by rubbing a surface of a polymer layer with paper or fabric in a given direction multiple times.

As the material used for the alignment film, for example, a material for forming polyimide, polyvinyl alcohol, a polymer having a polymerizable group described in JP1997-152509A (JP-H9-152509A), or an alignment film such as JP2005-097377A, JP2005-099228A, and JP2005-128503A is preferable.

In the optical element 10 according to the embodiment of the present invention, for example, the alignment film 24 can be suitably used as a so-called photo-alignment film obtained by irradiating a photo-alignable material with polarized light or non-polarized light. That is, in the optical element 10 according to the embodiment of the present invention, a photo-alignment film that is formed by applying a photo-alignable material to the support 20 is suitably used as the alignment film 24.

The irradiation of polarized light can be performed in a direction perpendicular or oblique to the photo-alignment film, and the irradiation of non-polarized light can be performed in a direction oblique to the photo-alignment film.

Preferable examples of the photo-alignable material used in the photo-alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-12823A.

Among these, an azo compound, a photocrosslinking polyimide, a photocrosslinking polyamide, a photocrosslinking polyester, a cinnamate compound, or a chalcone compound is suitability used.

The thickness of the alignment film is not particularly limited. The thickness with which a required alignment function can be obtained may be appropriately set depending on the material for forming the alignment film.

The thickness of the alignment film is preferably 0.01 to 5 μm and more preferably 0.05 to 2 μm.

<<Method of Forming Alignment Film>>

A method of forming the alignment film is not limited. Any one of various well-known methods corresponding to a material for forming the alignment film can be used. For example, a method including: applying the alignment film to a surface of the support 20; drying the applied alignment film; and exposing the alignment film to laser light to form an alignment pattern can be used.

Figure 5:
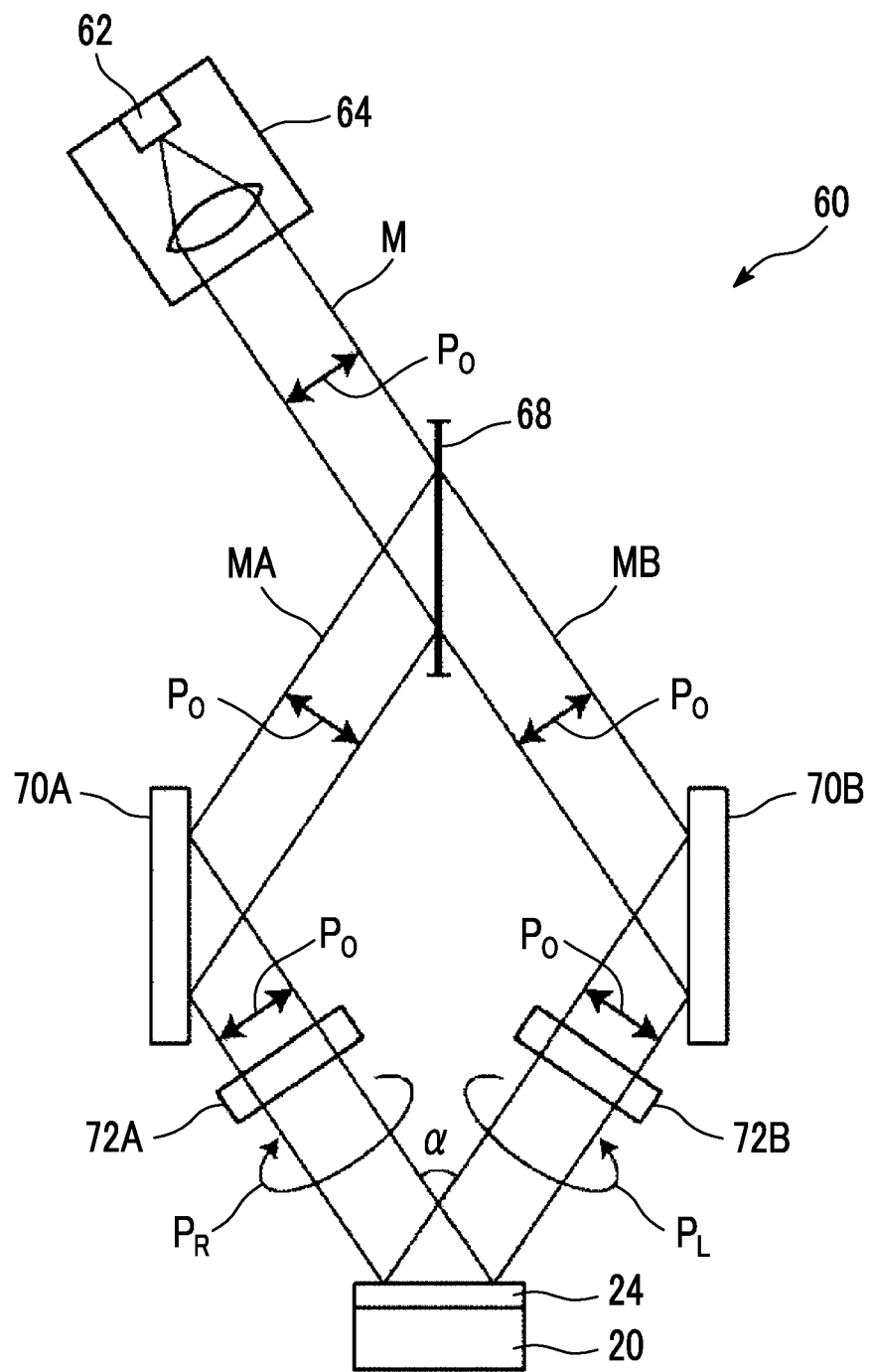
FIG. 5 is a conceptual diagram showing one example of an exposure device that exposes an alignment film of the optical element shown in FIG. 1.

FIG. 5 conceptually shows an example of an exposure device that exposes the alignment film to form an alignment pattern.

An exposure device 60 shown in FIG. 5 includes: a light source 64 that includes a laser 62; a polarization beam splitter 68 that splits laser light M emitted from the laser 62 into two beams MA and MB; mirrors 70A and 70B that are disposed on optical paths of the splitted two beams MA and MB; and λ/4 plates 72A and 72B.

Although not shown in the drawing, the light source 64 emits linearly polarized light $P_0$. The λ/4 plates 72A and 72B have optical axes perpendicular to each other. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 20 including the alignment film 24 on which the alignment pattern is not yet formed is disposed at an exposed portion, the two beams MA and MB intersect and interfere each other on the alignment film 24, and the alignment film 24 is irradiated with and exposed to the coherent light.

Due to the interference at this time, the polarization state of light with which the alignment film 24 is irradiated periodically changes according to interference fringes. As a result, in the alignment film 24, an alignment pattern in which the alignment state periodically changes can be obtained.

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 30A derived from the liquid crystal compound 30 continuously rotates in the in-plane direction, the length of the single period over which the optical axis 30A rotates by 180° in the in-plane direction in which the optical axis 30A rotates can be adjusted.

By forming the cholesteric liquid crystal layer on the alignment film having the alignment pattern in which the alignment state periodically changes, as described below, the cholesteric liquid crystal layer 26 having the liquid crystal alignment pattern in which the optical axis 30A derived from the liquid crystal compound 30 continuously rotates in the in-plane direction can be formed.

In addition, by rotating the optical axes of the λ/4 plates 72A and 72B by 90°, respectively, the rotation direction of the optical axis 30A can be reversed.

In the optical element according to the embodiment of the present invention, the alignment film is provided as a preferable aspect and is not an essential component.

For example, the following configuration can also be adopted, in which, by forming the alignment pattern on the support 20 using a method of rubbing the support 20, a method of processing the support 20 with laser light or the like, or the like, the cholesteric liquid crystal layer 26 or the like has the liquid crystal alignment pattern in which the direction of the optical axis 30A derived from the liquid crystal compound 30 changes while continuously rotating in at least one in-plane direction.

<<Cholesteric Liquid Crystal Layer>>

In the optical element 10, the cholesteric liquid crystal layer 26 is formed on a surface of the alignment film 24. In addition, the cholesteric liquid crystal layer 26 includes the first region 26a, the discontinuous portion 26c, and the second region 26b.

In FIG. 1, in order to simplify the drawing and to clarify the configuration of the optical element 10, portions of the first region 26a and the second region 26b of the cholesteric liquid crystal layer 26 corresponding to the 180° rotation (½ pitch of the helical structure) in the twisted direction of the liquid crystal compound 30 in the cholesteric liquid crystalline phase is conceptually shown. However, as conceptually shown in FIG. 2 using the first region 26a as an example, the first region 26a and the second region 26b of the cholesteric liquid crystal layer 26 have a helical structure in which the liquid crystal compound 30 is helically twisted and laminated along the helical axis in the thickness direction as in a cholesteric liquid crystal layer obtained by immobilizing a typical cholesteric liquid crystalline phase. In the helical structure, a configuration in which the liquid crystal compound 30 is helically rotated once (rotated by 360°) is set as one pitch of a helical period, and plural pitches of the helically twisted liquid crystal compound 30 are laminated.

Regarding this point, the same can also be applied to optical elements shown in FIGS. 8 and 9 described below.

The cholesteric liquid crystal layer 26 (the first region 26a and the second region 26b) is obtained by immobilizing a cholesteric liquid crystalline phase. That is, the cholesteric liquid crystal layer 26 is a layer formed of the liquid crystal compound 30 (liquid crystal material) having a cholesteric structure.

It is known that the cholesteric liquid crystalline phase exhibits selective reflection properties at a specific wavelength. The center wavelength $\lambda c$ of selective reflection (selective reflection center wavelength $\lambda$) depends on a pitch P (=helical period) of a helical structure in the cholesteric liquid crystalline phase and satisfies a relationship of $\lambda c = n \times P$ with an average refractive index n of the cholesteric liquid crystalline phase. Therefore, the selective reflection center wavelength can be adjusted by adjusting the pitch of the helical structure. The pitch of the cholesteric liquid crystalline phase depends on the kind of a chiral agent which is used in combination of a liquid crystal compound during the formation of the cholesteric liquid crystal layer, or the concentration of the chiral agent added. Therefore, a desired pitch can be obtained by adjusting the kind and concentration of the chiral agent.

The details of the adjustment of the pitch can be found in "Fuji Film Research & Development" No. 50 (2005), pp. 60 to 63. As a method of measuring a helical sense and a helical pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

The cholesteric liquid crystalline phase exhibits selective reflection properties with respect to left or circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystalline phase is right, right circularly polarized light is reflected, and in a case where the helical twisted direction of the cholesteric liquid crystalline phase is left, left circularly polarized light is reflected.

In the first region 26a and the second region 26b of the cholesteric liquid crystal layer 26, helical twisted directions of cholesteric liquid crystalline phases are the same. Accordingly, the first region 26a and the second region 26b reflect circularly polarized light in the same twisted direction.

A twisted direction of the cholesteric liquid crystalline phase can be adjusted by adjusting the kind of the liquid crystal compound that forms the cholesteric liquid crystal layer and/or the kind of the chiral agent to be added.

In addition, a half-width $\Delta\lambda$ (nm) of a selective reflection wavelength range (circularly polarized light reflection wavelength range) where selective reflection is exhibited depends on $\Delta n$ of the cholesteric liquid crystalline phase and the helical pitch P and complies with a relationship of $\Delta\lambda = \Delta n \times P$. Therefore, the width of the selective reflection wavelength range can be controlled by adjusting $\Delta n$. $\Delta n$ can be adjusted by adjusting a kind of a liquid crystal compound for forming the cholesteric liquid crystal layer and a mixing ratio thereof, and a temperature during alignment immobilization.

The half-width of the reflection wavelength range is adjusted depending on the application of the optical element 10 and may be, for example, 10 to 500 nm and is preferably 20 to 300 nm and more preferably 30 to 100 nm.

In the cholesteric liquid crystal layer 26 (the first region 26a and the second region 26b), a selective reflection interruption wavelength and a selective reflection wavelength range are not particularly limited and may be appropriately set depending on the use of the optical element 10.

Here, in the first region 26a and the second region 26b forming the cholesteric liquid crystal layer 26, it is preferable that selective reflection center wavelengths or selective reflection wavelength ranges match each other, but the present invention is not limited thereto. That is, in a case where a part of the selective reflection wavelength ranges in the first region 26a and the second region 26b overlap each other, interference of reflected light described below occurs depending on the thickness of the discontinuous portion 26c or the like. Therefore, the effects of the optical element 10 according to the embodiment of the present invention can be obtained.

The cholesteric liquid crystal layer 26 (the first region 26a and the second region 26b) can be obtained by immobilizing a cholesteric liquid crystalline phase.

The structure in which a cholesteric liquid crystalline phase is immobilized may be a structure in which the alignment of the liquid crystal compound as a cholesteric liquid crystalline phase is immobilized. Typically, the structure in which a cholesteric liquid crystalline phase is immobilized is preferably a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a cholesteric liquid crystalline phase is immobilized is not particularly limited as long as the optical characteristics of the cholesteric liquid crystalline phase are maintained, and the liquid crystal compound 30 in the cholesteric liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the cholesteric liquid crystal layer 26 obtained by immobilizing a cholesteric liquid crystalline phase include a liquid crystal composition including a liquid crystal compound. It is preferable that the liquid crystal compound is a polymerizable liquid crystal compound.

In addition, the liquid crystal composition used for forming the cholesteric liquid crystal layer may further include a surfactant and a chiral agent.

—Polymerizable Liquid Crystal Compound—

The polymerizable liquid crystal compound may be a rod-shaped liquid crystal compound or a disk-shaped liquid crystal compound.

Examples of the rod-shaped polymerizable liquid crystal compound for forming the cholesteric liquid crystalline phase include a rod-shaped nematic liquid crystal compound. As the rod-shaped nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a high-molecular-weight liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, 4,683,327A, 5,622,648A, 5,770,107A, WO95/022586, WO95/024455, WO97/000600, WO98/023580, WO98/052905, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described high-molecular-weight liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

—Disk-Shaped Liquid Crystal Compound—

As the disk-shaped liquid crystal compound, for example, compounds described in JP2007-108732A and JP2010-244038A can be preferably used.

In addition, the addition amount of the polymerizable liquid crystal compound in the liquid crystal composition is preferably 75% to 99.9 mass %, more preferably 80% to 99 mass %, and still more preferably 85% to 90 mass % with respect to the solid content mass (mass excluding a solvent) of the liquid crystal composition.

—Surfactant—

The liquid crystal composition used for forming the cholesteric liquid crystal layer may include a surfactant.

It is preferable that the surfactant is a compound that can function as an alignment controller contributing to the stable or rapid formation of a cholesteric liquid crystalline phase with planar alignment. Examples of the surfactant include a silicone surfactant and a fluorine surfactant. Among these, a fluorine surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

—Chiral Agent (Optically Active Compound)—

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to an emission wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

—Polymerization Initiator—

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in US2367661A and US2367670A), an acyloin ether (described in US2448828A), an α-hydrocarbon-substituted aromatic acyloin compound (described in US2722512A), a polynuclear quinone compound (described in US3046127A and US2,951,758A), a combination of a triarylimidazole dimer and p-aminophenyl ketone (described in US3549367A), an acridine compound and a phenazine compound (described in JP1985-105667A (JP-S60-105667A) and US4239850A), and an oxadiazole compound (described in US4212970A).

The content of the photopolymerization initiator in the liquid crystal composition is preferably 0.1 to 20 mass % and more preferably 0.5 to 12 mass % with respect to the content of the liquid crystal compound.

—Crosslinking Agent—

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth) acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris [3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a cholesteric liquid crystalline phase is further improved.

—Other Additives—

Optionally, a polymerization inhibitor, an antioxidant, an ultraviolet absorber, a light stabilizer, a coloring material, metal oxide particles, or the like can be added to the liquid crystal composition in a range where optical performance and the like do not deteriorate.

In a case where the cholesteric liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. Among these organic solvents, one kind may be used alone, or two or more kinds may be used in combination. Among these, a ketone is preferable in consideration of an environmental burden.

In a case where the cholesteric liquid crystal layer 26 (the first region 26a and the second region 26b) is formed, it is preferable that the cholesteric liquid crystal layer is formed by applying the liquid crystal composition to a surface where the cholesteric liquid crystal layer is to be formed, aligning the liquid crystal compound to a state of a cholesteric liquid crystalline phase, and curing the liquid crystal compound.

That is, in a case where the cholesteric liquid crystal layer is formed on the alignment film, it is preferable that the cholesteric liquid crystal layer obtained by immobilizing a cholesteric liquid crystalline phase is formed by applying the liquid crystal composition to the alignment film, aligning the liquid crystal compound to a state of a cholesteric liquid crystalline phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the cholesteric liquid crystal layer. In the drying and/or heating step, the liquid crystal compound in the liquid crystal composition only has to be aligned to a cholesteric liquid crystalline phase. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

The thickness of the cholesteric liquid crystal layer is not particularly limited, and the thickness with which a required light reflectivity can be obtained may be appropriately set depending on the use of the optical element 10, the light reflectivity required for the cholesteric liquid crystal layer, the material for forming the cholesteric liquid crystal layer, and the like.

In the optical element 10 according to the embodiment of the present invention, the cholesteric liquid crystal layer 26 (the first region 26a and the second region 26b) has the liquid crystal alignment pattern in which the direction of the optical axis 30A derived from the liquid crystal compound 30 forming the cholesteric liquid crystalline phase changes while continuously rotating in the in-plane direction of the cholesteric liquid crystal layer.

The optical axis 30A derived from the liquid crystal compound 30 is an axis having the highest refractive index in the liquid crystal compound 30, that is, a so-called slow axis. For example, in a case where the liquid crystal compound 30 is a rod-shaped liquid crystal compound, the optical axis 30A is along a rod-shaped major axis direction.

Figure 3:
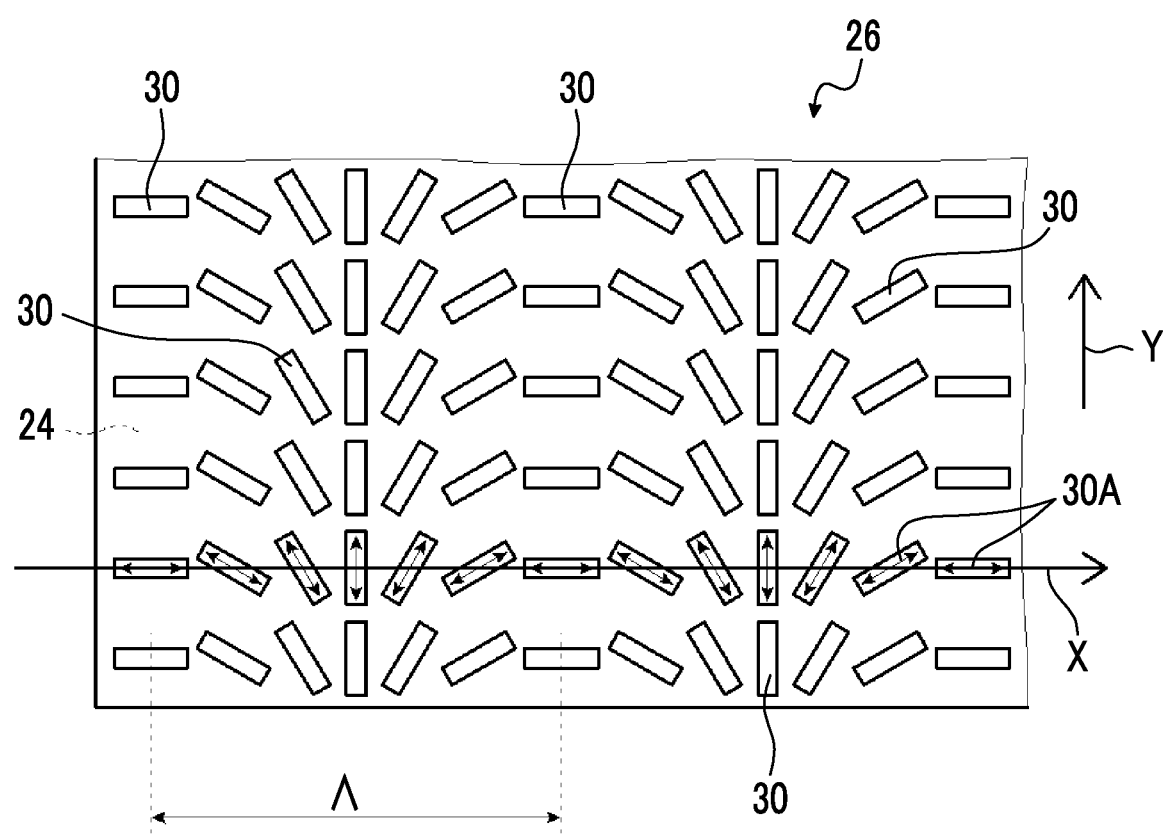
FIG. 3 is a plan view conceptually showing the cholesteric liquid crystal layer of the optical element shown in FIG. 1.

FIG. 3 conceptually shows a plan view of the cholesteric liquid crystal layer 26.

The plan view is a view in a case where the optical element 10 is seen from the top in FIG. 1, that is, a view in a case where the optical element 10 is seen from a thickness direction (laminating direction of the respective layers (films)).

In addition, in FIG. 3, in order to clarify the configuration of the optical element 10 according to the embodiment of the present invention, only the liquid crystal compound 30 on the surface of the alignment film 24 is shown.

As shown in FIG. 3, on the surface of the alignment film 24, the liquid crystal compound 30 forming the cholesteric liquid crystal layer 26 is two-dimensionally arranged according to the alignment pattern formed on the alignment film 24 as the lower layer in a predetermined in-plane direction indicated by arrow X and a direction perpendicular to the in-plane direction (arrow X direction).

In the following description, the direction perpendicular to the arrow X direction will be referred to as "Y direction" for convenience of description. That is, in FIGS. 1 and 2 and FIG. 4 described below, the Y direction is a direction perpendicular to the paper plane.

In addition, the liquid crystal compound 30 forming the cholesteric liquid crystal layer 26 has the liquid crystal alignment pattern in which the direction of the optical axis 30A changes while continuously rotating in the arrow X direction in a plane of the cholesteric liquid crystal layer 26. In the example shown in the drawing, the liquid crystal compound 30 has the liquid crystal alignment pattern in which the optical axis 30A of the liquid crystal compound 30 changes while continuously rotating clockwise in the arrow X direction.

Specifically, "the direction of the optical axis 30A of the liquid crystal compound 30 changes while continuously rotating in the arrow X direction (the predetermined in-plane direction)" represents that an angle between the optical axis 30A of the liquid crystal compound 30, which is arranged in the arrow X direction, and the arrow X direction varies depending on positions in the arrow X direction, and the angle between the optical axis 30A and the arrow X direction sequentially changes from θ to θ+180° or θ−180° in the arrow X direction.

A difference between the angles of the optical axes 30A of the liquid crystal compound 30 adjacent to each other in the arrow X direction is preferably 45° or less, more preferably 15° or less, and still more preferably less than 15°.

On the other hand, in the liquid crystal compound 30 forming the cholesteric liquid crystal layer 26, the directions of the optical axes 30A are the same in the Y direction perpendicular to the arrow X direction, that is, the Y direction perpendicular to the in-plane direction in which the optical axis A continuously rotates.

In other words, in the liquid crystal compound 30 forming the cholesteric liquid crystal layer 26, angles between the optical axes 30A of the liquid crystal compound 30 and the arrow X direction are the same in the Y direction.

In the optical element 10 according to the embodiment of the present invention, in the liquid crystal alignment pattern of the liquid crystal compound 30, the length (distance) over which the optical axis 30A of the liquid crystal compound 30 rotates by 180° in the arrow X direction in which the optical axis 30A changes while continuously rotating in a plane is the length Λ of the single period in the liquid crystal alignment pattern.

That is, a distance between centers of two liquid crystal compounds 30 in the arrow X direction is the length Λ of the single period, the two liquid crystal compounds having the same angle in the arrow X direction. Specifically, as shown in FIG. 3, a distance of centers in the arrow X direction of two liquid crystal compounds 30 in which the arrow X direction and the direction of the optical axis 30A match each other is the length Λ of the single period. In the following description, the length Λ of the single period will also be referred to as "single period Λ".

In the optical element 10 according to the embodiment of the present invention, in the liquid crystal alignment pattern of the cholesteric liquid crystal layer, the single period Λ is repeated in the arrow X direction, that is, in the in-plane direction in which the direction of the optical axis 30A changes while continuously rotating.

The cholesteric liquid crystal layer 26 has the liquid crystal alignment pattern in which the optical axis 30A changes while continuously rotating in the arrow X direction in a plane (the predetermined in-plane direction).

The cholesteric liquid crystal layer obtained by immobilizing a cholesteric liquid crystalline phase typically reflects incident light (circularly polarized light) by specular reflection.

On the other hand, the cholesteric liquid crystal layer 26 having the above-described liquid crystal alignment pattern reflects incidence light in a direction having an angle in the arrow X direction with respect to specular reflection. For example, in the cholesteric liquid crystal layer 26, light incident from the normal direction is reflected in a state where it is tilted as indicated by the arrow X with respect to the normal direction instead of being reflected in the normal direction. That is, the light incident from the normal direction refers to light incident from the front side that is light incident to be perpendicular to a main surface. The main surface refers to the maximum surface of a sheet-shaped material.

Figure 4:
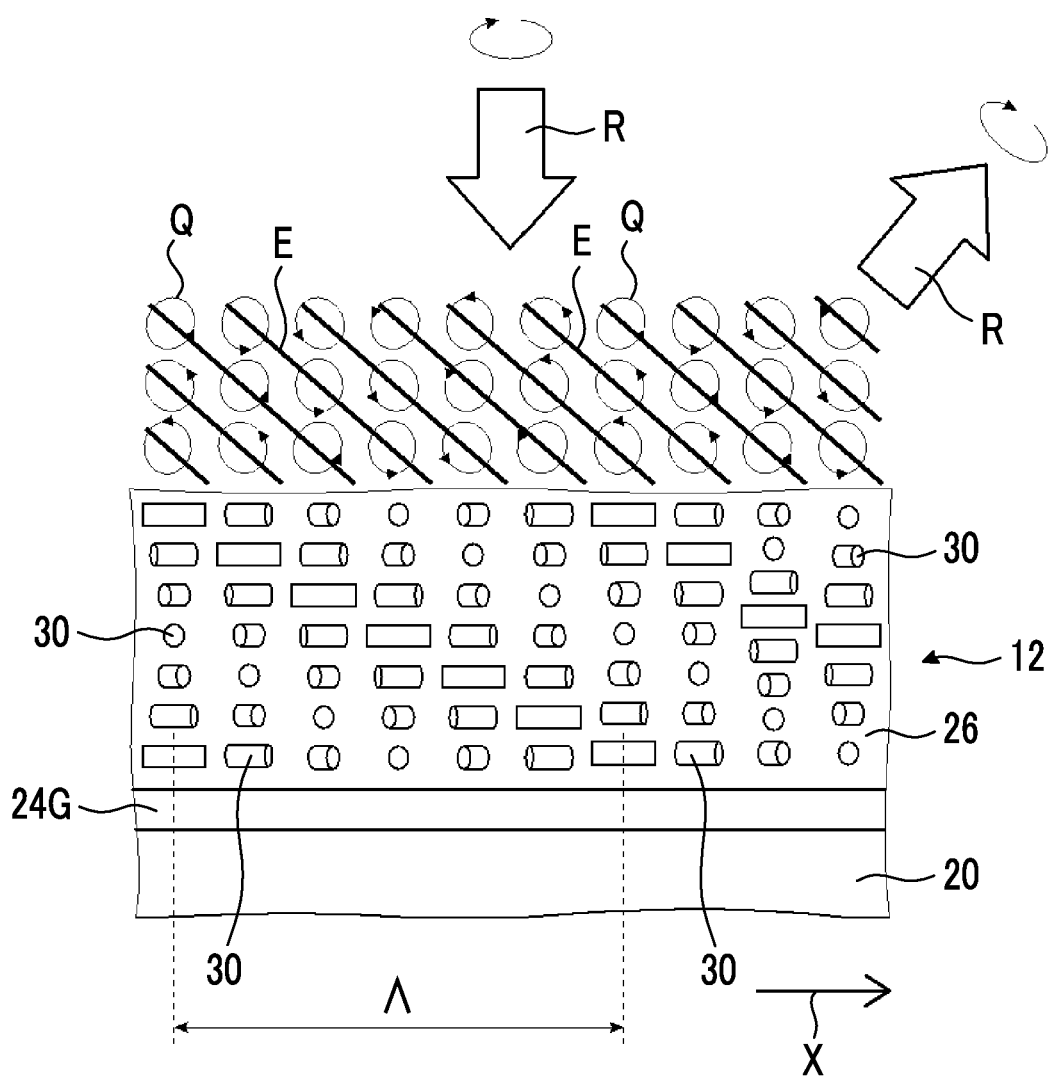
FIG. 4 is a conceptual diagram showing an action of the cholesteric liquid crystal layer of the optical element shown in FIG. 1.

Hereinafter, the description will be made with reference to FIG. 4.

As described above, the cholesteric liquid crystal layer 26 selectively reflects light in a predetermined wavelength range, for example, red light, green light, or blue light. In addition, the cholesteric liquid crystal layer 26 selectively reflects right circularly polarized light or left circularly polarized light.

In a preferable aspect, basically, the first region 26a and the second region 26b forming the cholesteric liquid crystal layer 26 reflect the same circularly polarized light having the same color.

Accordingly, in a case where the cholesteric liquid crystal layer 26 reflects, for example, right circularly polarized light of green light, the cholesteric liquid crystal layer 26 reflects only green right circularly polarized light and allows transmission of the other light. In the following description, for example, the cholesteric liquid crystal layer 26 reflects right circularly polarized light R of a predetermined color.

In a case where the right circularly polarized light R incident into the cholesteric liquid crystal layer 26 (the first region 26a and the second region 26b) is reflected from the cholesteric liquid crystal layer 26, the absolute phase changes depending on the directions of the optical axes 30A of the respective liquid crystal compounds 30.

Here, in the cholesteric liquid crystal layer 26, the optical axis 30A of the liquid crystal compound 30 changes while rotating in the arrow X direction (the in-plane direction). Therefore, the amount of change in the absolute phase of the incident right circularly polarized light R varies depending on the direction of the optical axis 30A.

Further, the liquid crystal alignment pattern formed in the cholesteric liquid crystal layer 26 is a pattern that is periodic in the arrow X direction. Therefore, as conceptually shown in FIG. 4, an absolute phase Q that is periodic in the arrow X direction corresponding to the direction of the optical axis 30A is assigned to the right circularly polarized light R incident into the cholesteric liquid crystal layer 26.

In addition, the direction of the optical axis 30A of the liquid crystal compound 30 with respect to the arrow X direction is uniform in the arrangement of the liquid crystal compound 30 in the Y direction perpendicular to arrow X direction.

As a result, in the cholesteric liquid crystal layer 26, an equiphase surface E that is tilted in the arrow X direction with respect to an XY plane is formed for the right circularly polarized light R.

Therefore, the right circularly polarized light R is reflected in the normal direction of the equiphase surface E (direction perpendicular to the equiphase surface E), and the reflected right circularly polarized light R is reflected in a direction that is tilted in the arrow X direction with respect to the XY plane (main surface of the cholesteric liquid crystal layer 26).

Here, a reflection angle of light from the cholesteric liquid crystal layer in which the optical axis 30A of the liquid crystal compound 30 continuously rotates in the in-plane direction (arrow X direction) varies depending on wavelengths of light to be reflected. Specifically, as the wavelength of light increases, the angle of reflected light with respect to incidence light increases. That is, as the wavelength of light increases, the angle at which the light is reflected by specular reflection increases.

On the other hand, a reflection angle of light from the cholesteric liquid crystal layer in which the optical axis 30A of the liquid crystal compound 30 continuously rotates in the in-plane direction varies depending on the length Λ of the single period of the liquid crystal alignment pattern over which the optical axis 30A rotates by 180°, that is, depending on the single period Λ. Specifically, as the length of the single period Λ decreases, the angle of reflected light with respect to incidence light increases.

In the optical element 10 according to the embodiment of the present invention, the single period Λ in the alignment pattern of the cholesteric liquid crystal layer 26 is not particularly limited and may be appropriately set depending on the use of the optical element 10 and the like. In this case, in the first region 26a and the second region 26b forming the cholesteric liquid crystal layer 26, it is preferable that the lengths of the single periods Λ are the same.

In addition, in the first region 26a and the second region 26b forming the cholesteric liquid crystal layer 26, it is preferable that the directions in which the optical axes 30a continuously change while rotating are the same. That is, in the first region 26a and the second region 26b, it is preferable that the arrow X directions as the in-plane directions in which the optical axes 30A rotate match each other.

In addition, in the first region 26a and the second region 26b forming the cholesteric liquid crystal layer 26, it is preferable that the rotation direction of the optical axes 30a in the arrow X direction are the same. That is, regarding the rotation direction of the optical axis 30A in the arrow X direction, in a case where the direction of the first region 26a is clockwise, it is preferable that the direction of the second region 26b is also clockwise.

As a result, in the cholesteric liquid crystal layer 26, light at the same wavelength can be reflected in the same direction from the first region 26a and the second region 26b.

<<<Discontinuous Portion of Bright Line and Dark Line>>>

As described above, the cholesteric liquid crystal layer 26 includes the first region 26a, the discontinuous portion 26c, and the second region 26b in this order from below.

Both the first region 26a and the second region 26b are cholesteric liquid crystal layers obtained by immobilizing a cholesteric liquid crystalline phase. On the other hand, the discontinuous portion 26c is a portion as a so-called defect portion (defect layer) that is positioned between the first region 26a and the second region 26b in the thickness direction in the cholesteric liquid crystal layer 26 and has different properties from those of the first region 26a and the second region 26b.

For example, the discontinuous portion 26c of the optical element 10 shown in FIG. 1 is a liquid crystal layer (horizontally aligned liquid crystal layer) obtained by laminating the liquid crystal compounds 30 having the optical axes 30A in the same direction, in which the optical axis 30A of the liquid crystal compound 30 rotates in the in-plane direction (arrow X direction) as in the first region 26a and the second region 26b in the plane direction but does not helically twist in the thickness direction.

As is well-known, in a cross-section (cross-sectional SEM image) of the cholesteric liquid crystal layer observed with a scanning electron microscope (SEM), a stripe pattern of a bright line (bright portion) and a dark line (dark portion) is applied.

In the case of a typical cholesteric liquid crystal layer, the stripe pattern of a bright line and a dark line is elongated in the plane direction (the horizontal direction in the drawing) and is laminated in the thickness direction.

Figure 10:
FIG. 10 is a view conceptually showing a cross-sectional SEM image of the cholesteric liquid crystal layer of the optical element shown in FIG. 1.
Figure 11:
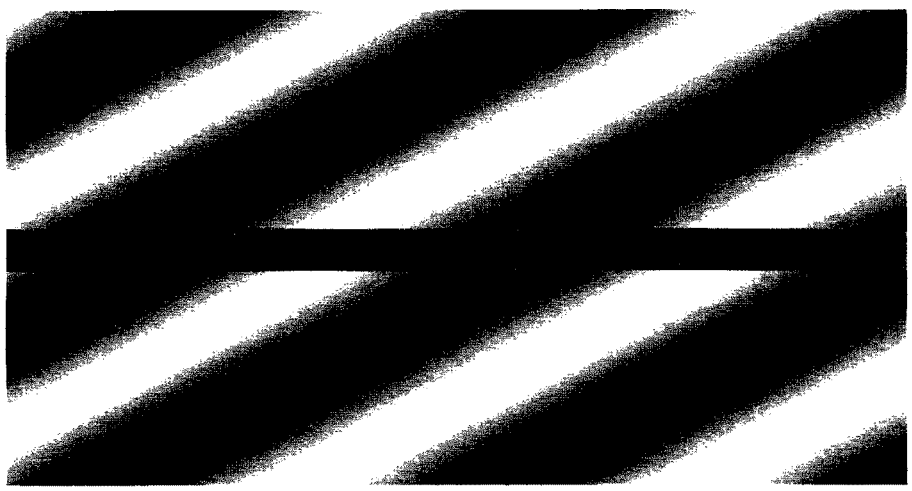
FIG. 11 is a view conceptually showing a cross-sectional SEM image of the cholesteric liquid crystal layer of the optical element shown in FIG. 8.
Figure 12:
FIG. 12 is a view conceptually showing a cross-sectional SEM image of the cholesteric liquid crystal layer of the optical element shown in FIG. 9.

On the other hand, as in the cholesteric liquid crystal layer 26 in the optical element according to the embodiment of the present invention, in the cholesteric liquid crystal layer having the liquid crystal alignment pattern in which the optical axis 30A of the liquid crystal compound 30 rotates in the in-plane direction (arrow X direction), the stripe pattern of a bright line and a dark line is tilted with respect to the thickness direction and the plane direction (FIGS. 10 to 12 described below).

Specifically, in the optical element 10 according to the embodiment of the present invention, the discontinuous portion 26c is a portion where a bright line and a dark line derived from a cholesteric liquid crystalline phase are discontinuous in a cross-sectional view obtained by observing, using a SEM, a cross-section of the cholesteric liquid crystal layer 26 taken in the thickness direction conforming the in-plane direction (arrow X direction) in which the direction of the optical axis 30A rotates. In the cross-sectional view, the discontinuous portion 26c is observed in the in-plane direction in which the direction of the optical axis 30A rotates.

In the case of the liquid crystal layer in which the liquid crystal compound 30 does not helically twist in the thickness direction and the optical axis 30A rotates only in the plane direction as in the discontinuous portion 26c shown in the drawing, the first region 26a and the second region 26b are observed as regions where angles of the bright line and the dark line are different. Specifically, as conceptually shown in FIG. 10, in the discontinuous portion 26c, the bright line and the dark line are formed in the thickness direction of the cholesteric liquid crystal layer 26.

<<<Action of Cholesteric Liquid Crystal Layer>>>

The optical element 10 according to the embodiment of the present invention is a novel optical element in which the discontinuous portion 26c is provided halfway in the thickness direction of the cholesteric liquid crystal layer 26. With the above-described configuration, light reflection properties changes depending on received stimuli.

Figure 6:
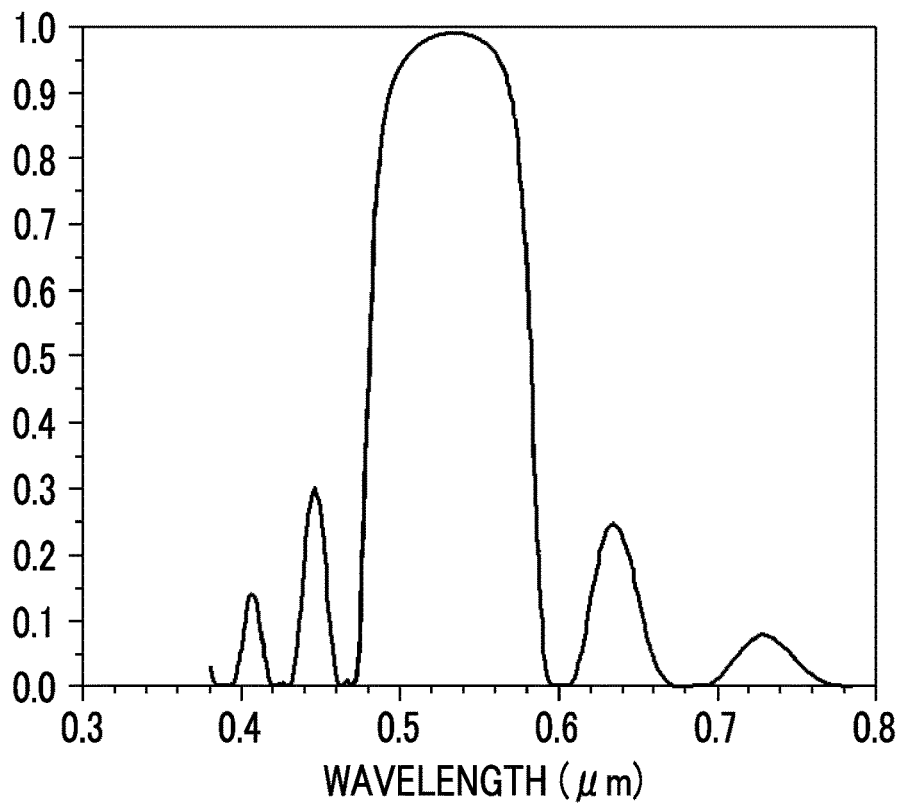
FIG. 6 is a diagram conceptually showing reflection properties of a typical cholesteric liquid crystal layer.
Figure 7:
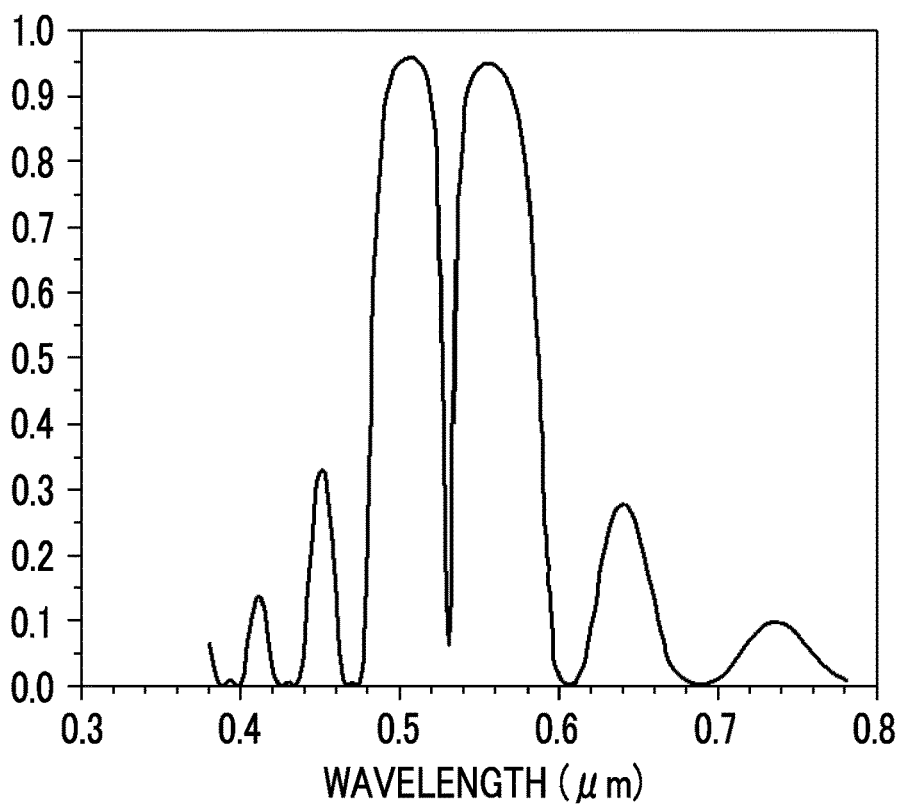
FIG. 7 is a view conceptually showing reflection properties of the cholesteric liquid crystal layer of the optical element shown in FIG. 1.

FIG. 6 shows reflection properties of a general cholesteric liquid crystal layer. In FIG. 6 and FIG. 7 described below, the horizontal axis represents a wavelength, and the vertical axis represents a normalized value of a reflectivity.

As described above, the cholesteric liquid crystal layer has wavelength selectivity in reflection, and thus reflects light in a wavelength range near the selective reflection center wavelength at a substantially uniformly high reflectivity as shown in FIG. 6.

On the other hand, in the optical element 10 according to the embodiment of the present invention, the discontinuous portion 26c that is not formed of a cholesteric crystalline phase is provided halfway in the thickness direction of the cholesteric liquid crystal layer 26. Therefore, in the cholesteric liquid crystal layer 26, the first region 26a and the second region 26b each independently reflect light in a predetermined wavelength range.

As a result, the cholesteric liquid crystal layer 26 including the discontinuous portion 26c, light reflected from the first region 26a and light reflected from the second region 26b interfere each other such that a wavelength (wavelength range) at which a reflectivity rapidly decreases as shown in FIG. 7 regarding light reflection properties is generated.

Further, the wavelength at which a reflectivity rapidly decreases moves to a longer wavelength side in a case where the cholesteric liquid crystal layer 26 receives a stimulus such as a mechanical stress.

Using the properties, the optical element 10 according to the embodiment of the present invention can be used as a sensor that detects a stimulus such as stress.

In FIGS. 6 and 7, the horizontal axis represents a wavelength but is converted into a diffraction angle in a case where the cholesteric liquid crystal layer 26 is a liquid crystal diffraction element.

As described above, in the cholesteric liquid crystal layer 26 having the liquid crystal alignment pattern in which the optical axis 30A rotates in the in-plane direction, light is reflected in a state where it is tilted in the direction (or a direction opposite thereto) in which the optical axis 30A rotates with respect to specular reflection. That is, the cholesteric liquid crystal layer 26 having the liquid crystal alignment pattern in which the optical axis 30A rotates in the in-plane direction acts as a liquid crystal diffraction element.

Here, as described above, the reflection angle with respect to the incidence angle, that is, the diffraction angle increases as the wavelength of the light increases. Accordingly, in a case where the cholesteric liquid crystal layer 26 receives a stimulus such that the wavelength at which the reflectivity rapidly decreases increases, the reflection angle (diffraction angle) of the wavelength at which the reflectivity rapidly decreases is larger than that before the cholesteric liquid crystal layer 26 receives a stimulus.

Figure 14:
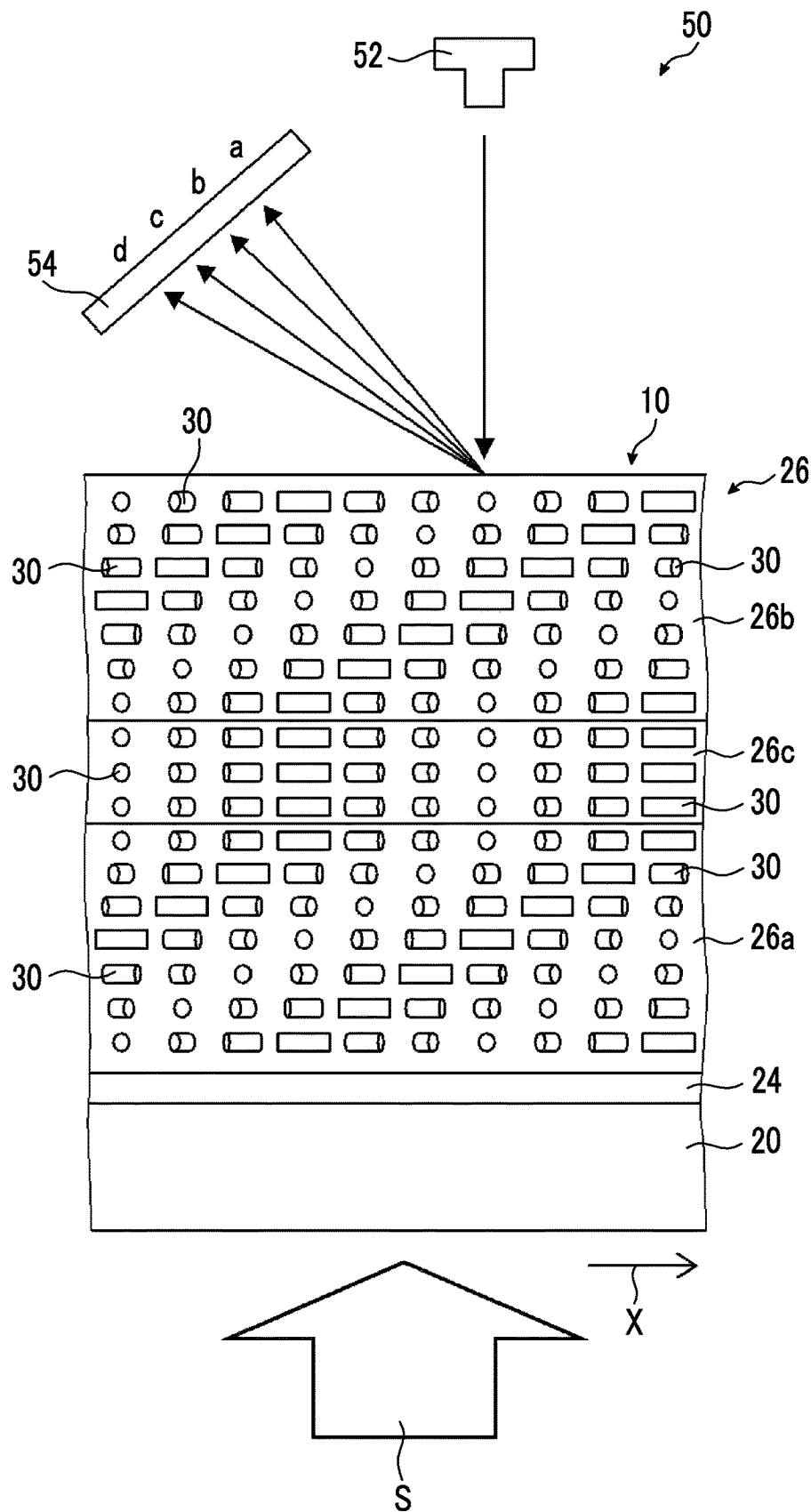
FIG. 14 is a diagram conceptually showing an example of a sensor according to the present invention.

That is, in a case where light reflected from the optical element 10 is detected by a photodetector as shown in FIG. 14 described below, the output of a pixel corresponding to the reflection angle of the wavelength at which the reflectivity rapidly decreases is much lower than that in the surrounding environment. In a case where the optical element 10 receives a stimulus in this state, the wavelength at which the reflectivity rapidly decreases increases, and the reflection angle of a wavelength at which the reflectivity is low varies. Therefore, the output of a pixel where the output intensity is low before the cholesteric liquid crystal layer 26 receives a stimulus increases, and the output of another pixel decreases. Accordingly, by detecting a change in the output intensity of the pixel where the output intensity is low before the cholesteric liquid crystal layer 26 receives a stimulus, the reception of a stimulus by the optical element 10 can be detected.

<<<Thickness of Cholesteric Liquid Crystal Layer>>>

In the optical element 10 according to the embodiment of the present invention, the appearance of the wavelength (wavelength range) in which the reflectivity rapidly decreases and the wavelength in which the reflectivity rapidly decreases in the selective reflection wavelength range are largely affected by the refractive index and thickness of a material for forming the discontinuous portion 26c and, for example, can be simulated using the refractive index and thickness of the material for forming the discontinuous portion 26c.

Here, the material for forming the discontinuous portion 26c is likely to be an organic matter, and the refractive index is substantially about 1.55 without a large deviation. In consideration of this point, the reflection properties of the cholesteric liquid crystal layer 26 are affected by the thickness of the discontinuous portion 26c.

According to the investigation by the present inventors, in a case where the wavelength at which the reflectivity rapidly decreases to the maximum in the selective reflection wavelength range of the cholesteric liquid crystal layer 26 (the optical element 10) is 550 nm, the thickness of the discontinuous portion 26c is preferably 30 to 150 nm, more preferably 50 to 130 nm, still more preferably 70 to 110 nm, and most preferably 90 nm.

Here, in a case where the wavelength at which the reflectivity rapidly decreases to the maximum in the selective reflection wavelength range of the cholesteric liquid crystal layer 26 changes, a preferable thickness of the discontinuous portion 26c changes in proportion to the wavelength. For example, in a case where the wavelength at which the reflectivity decreases to the maximum is 940 nm, the preferable thickness of the discontinuous portion 26c can be calculated by multiplying the above-described value by 940/550. Specifically, in a case where the wavelength at which the reflectivity decreases to the maximum is 940 nm, the thickness of the discontinuous portion 26c is preferably 51 to 256 nm, more preferably 85 to 222 nm, still more preferably 120 to 188 nm, and most preferably 154 nm.

That is, in the optical element 10 according to the embodiment of the present invention, in a case where the wavelength at which the reflectivity rapidly decreases to the maximum in the selective reflection wavelength range is represented by λm [nm], it is preferable that the thickness [nm] of the discontinuous portion 26c of the cholesteric liquid crystal layer 26 is in the following range.

$$30\times(\lambda m/550) \text{ to } 150\times(\lambda m/550).$$

In the optical element 10 according to the embodiment of the present invention, the thicknesses of the first region 26a and the second region 26b of the cholesteric liquid crystal layer 26 are not particularly limited. The thickness of each of the first region 26a and the second region 26b may be appropriately adjusted to a value where desired light can be reflected according to the selective reflection center wavelength, that is, the pitch P of the helical structure in the cholesteric liquid crystalline phase and the like.

Accordingly, the thicknesses of the first region 26a and the second region 26b may be different from each other. For example, in a case where the first region 26a side is a light incidence side and the first region 26a is excessively thick, all or most of light is reflected from the first region 26a, and a sufficient amount of light does not reach the second region 26b. As a result, light interference does not occur, and the wavelength at which the reflectivity rapidly decreases is not generated in the selective reflection wavelength range.

Accordingly, it is necessary to set the thicknesses of the first region 26a and the second region 26b in consideration of the above-described point.

<<Method of Forming Cholesteric Liquid Crystal Layer>>

As described above, in the cholesteric liquid crystal layer 26 of the optical element 10, the first region 26a and the second region 26b are cholesteric liquid crystal layers in which the optical axis 30A rotates in the in-plane direction. On the other hand, in the cholesteric liquid crystal layer 26 of the optical element 10, the discontinuous portion 26c is a liquid crystal layer in which the optical axis 30A rotates in the in-plane direction but does not helically twist in the thickness direction.

The above-described cholesteric liquid crystal layer 26 can be formed, for example, as follows.

First, as described above, for example, the composition including the photo-alignable material is applied to the surface of the support 20, is dried, is exposed using the exposure device 60 shown in FIG. 5, and is optionally cured by ultraviolet irradiation or the like. As a result, the alignment film 24 on which the alignment pattern is formed is formed.

Next, as described above, the liquid crystal composition including the polymerizable liquid crystal compound, the chiral agent, and the polymerization initiator is applied to the alignment film 24 and is cured by heating and ultraviolet irradiation. As a result, the first region 26a as the cholesteric liquid crystal layer is formed.

Next, the same liquid crystal composition as that of the first region 26a except that it does not include the chiral agent is applied to the first region 26a and is cured by heating and ultraviolet irradiation. As a result, the discontinuous portion 26c is formed.

In a case where the liquid crystal layer is formed on the liquid crystal layer, the alignment of the liquid crystal compound of the upper liquid crystal layer follows the alignment of the liquid crystal compound on the surface of the lower liquid crystal layer. In addition, the liquid crystal composition for forming the discontinuous portion 26c does not include the chiral agent. Therefore, the liquid crystal compound is not helically twisted and aligned in the thickness direction.

Therefore, in the discontinuous portion 26c, the liquid crystal compound is aligned in the same liquid crystal alignment pattern as that of the upper surface of the first region 26a in the plane direction, and the liquid crystal compound that is aligned in the same direction is laminated in the thickness direction without being twisted and aligned.

Next, the second region 26b is formed on the discontinuous portion 26c using the same method as that of the first region 26a. In a case where the liquid crystal layer is formed on the liquid crystal layer, the alignment of the liquid crystal compound of the upper liquid crystal layer follows the alignment of the liquid crystal compound on the surface of the lower liquid crystal layer.

Therefore, the second region 26b is formed as the cholesteric liquid crystal layer in which the lower surface has the same liquid crystal alignment pattern as that of the upper surface of the discontinuous portion 26c and the liquid crystal compound 30 is helically twisted in the thickness direction.

Accordingly, in the cholesteric liquid crystal layer 26 of the optical element 10, as shown in FIG. 1, the upper surface of the first region 26a and the lower surface of the discontinuous portion 26c have the same liquid crystal alignment pattern, the lower surface and the upper surface of the discontinuous portion 26c have the same liquid crystal alignment pattern, and the upper surface of the discontinuous portion 26c and the lower surface of the second region 26b have the same liquid crystal alignment pattern.

Accordingly, the upper surface of the first region 26a and the lower surface of the second region 26b have the same liquid crystal alignment pattern, and in the liquid crystal compounds 30 facing each other in the thickness direction with respect to the discontinuous portion 26c, the directions of the optical axes 30A are the same.

In the cholesteric liquid crystal layer 26 of the optical element 10 shown in FIG. 1, the liquid crystal compound 30 forming the discontinuous portion 26c is laminated in the same direction without being twisted in the thickness direction, but the present invention is not limited thereto.

That is, in the cholesteric liquid crystal layer 26, the liquid crystal compound 30 forming the discontinuous portion 26c may be helically twisted in the thickness direction. At this time, the bright line and the dark line in the cross-sectional SEM image of the discontinuous portion 26c are tilted with respect to the thickness direction and the plane direction without being formed in the thickness direction of the cholesteric liquid crystal layer 26 as shown in FIG. 10, and angles of the bright lines and the dark lines in the first region 26a and the second region 26b are different from each other.

In addition, in a case where the liquid crystal compound 30 forming the discontinuous portion 26c is helically twisted in the thickness direction, it is preferable that the pitch P of the helical structure in the first region 26a is different from that of the second region 26b, and it is more preferable that the discontinuous portion 26c has a thickness (the number of pitches of the helical structure) where the discontinuous portion 26c does not reflect light.

<Other Aspect of Optical Element>

In the optical element 10 shown in FIG. 1, the discontinuous portion 26c is the liquid crystal layer, that is, the optically-anisotropic layer, but the present invention is not limited thereto. Various configurations can be adopted as long as the discontinuous portion where a bright line and a dark line are discontinuous is observed in the in-plane direction in which the optical axis 30A rotates in the cross-sectional SEM image taken in the in-plane direction in which the optical axis 30A rotates.

Figure 8:
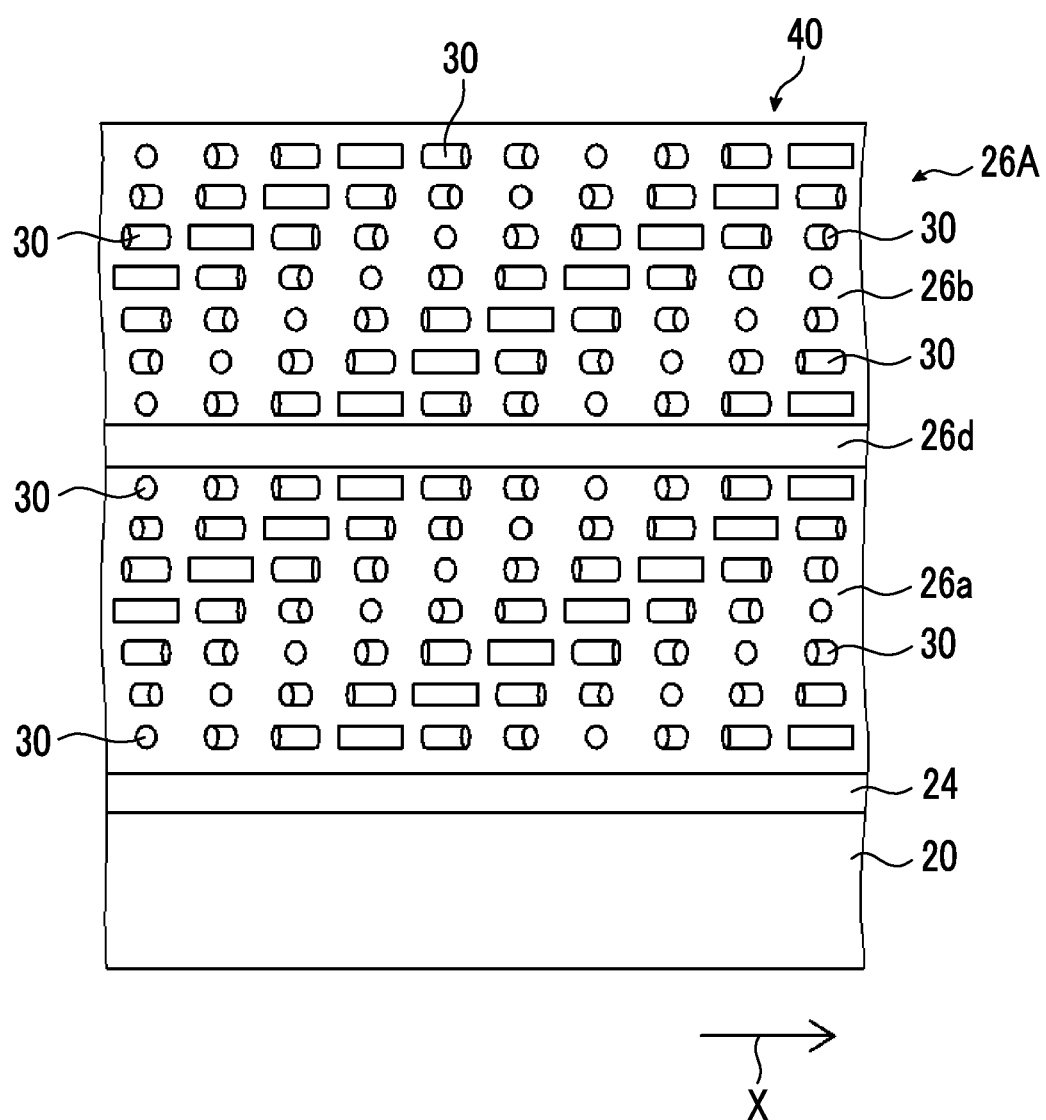
FIG. 8 is a diagram conceptually showing still another example of the optical element according to the present invention.

For example, the configuration conceptually shown in FIG. 8 can be adopted. In the optical element 40 shown in FIG. 8, a plurality of members that are the same as those in the above-described optical element 10 are used. Therefore, the same members are represented by the same reference numerals, and different members will be mainly described below. Regarding this point, the same can also be applied to the optical element shown in FIG. 9.

In a cholesteric liquid crystal layer 26A of the optical element 40 shown in FIG. 8, an isotropic layer is provided instead of the liquid crystal layer as a discontinuous portion 26d that is provided between the first region 26a and the second region 26b.

That is, the discontinuous portion 26d as the isotropic layer is also a so-called defect portion (defect layer) that is positioned between the first region 26a and the second region 26b in the thickness direction in the cholesteric liquid crystal layer 26A and has different properties from those of the first region 26a and the second region 26b.

Accordingly, with this configuration, the same effects as those of the optical element 10 shown in FIG. 1 where light reflected from the first region 26a and light reflected from the second region 26b interfere each other are exhibited. As a result, even in the optical element 40 shown in FIG. 8, in a case where the wavelength (wavelength range) at which the reflectivity rapidly decreases is generated in the selective reflection wavelength range of the cholesteric liquid crystal layer and the cholesteric liquid crystal layer receives an external stimulus, the wavelength at which the reflectivity rapidly decreases changes.

FIG. 11 conceptually shows a cross-sectional SEM image of the cholesteric liquid crystal layer 26A including the discontinuous portion 26d taken in the in-plane direction in which the optical axis 30A of the liquid crystal compound rotates. As shown in FIG. 11, the cholesteric liquid crystal layer 26A is in a state in which a portion where a bright line and a dark line tilted with respect to the thickness direction and the plane direction are disconnected in the discontinuous portion 26d provided between the first region 26a and the second region 26b is formed in the in-plane direction in which the optical axis 30A rotates.

The cholesteric liquid crystal layer 26A can be formed by forming the discontinuous portion 26d as the isotropic layer instead of the discontinuous portion 26c as the liquid crystal layer during the formation of the cholesteric liquid crystal layer 26.

The discontinuous portion 26d as the isotropic layer may be formed using a well-known isotropic material and a well-known method corresponding to the material, and examples of the isotropic material include acryl, modified cellulose, polyamide, epoxy, polyacetal, acryl, polystyrene, polyurethane, polyvinyl alcohol, polyvinyl formal, polyamide, polyester, polyethyleneimine, polyallylamine, and polyalkylene glycol.

The discontinuous portion 26d may act as an alignment film for aligning the liquid crystal compound 30 of the second region 26b to the above-described liquid crystal alignment pattern. Alternatively, the discontinuous portion 26d may include the isotropic layer and the alignment film that is provided above the isotropic layer to align the liquid crystal compound 30 of the second region 26b to the above-described liquid crystal alignment pattern.

Figure 9:
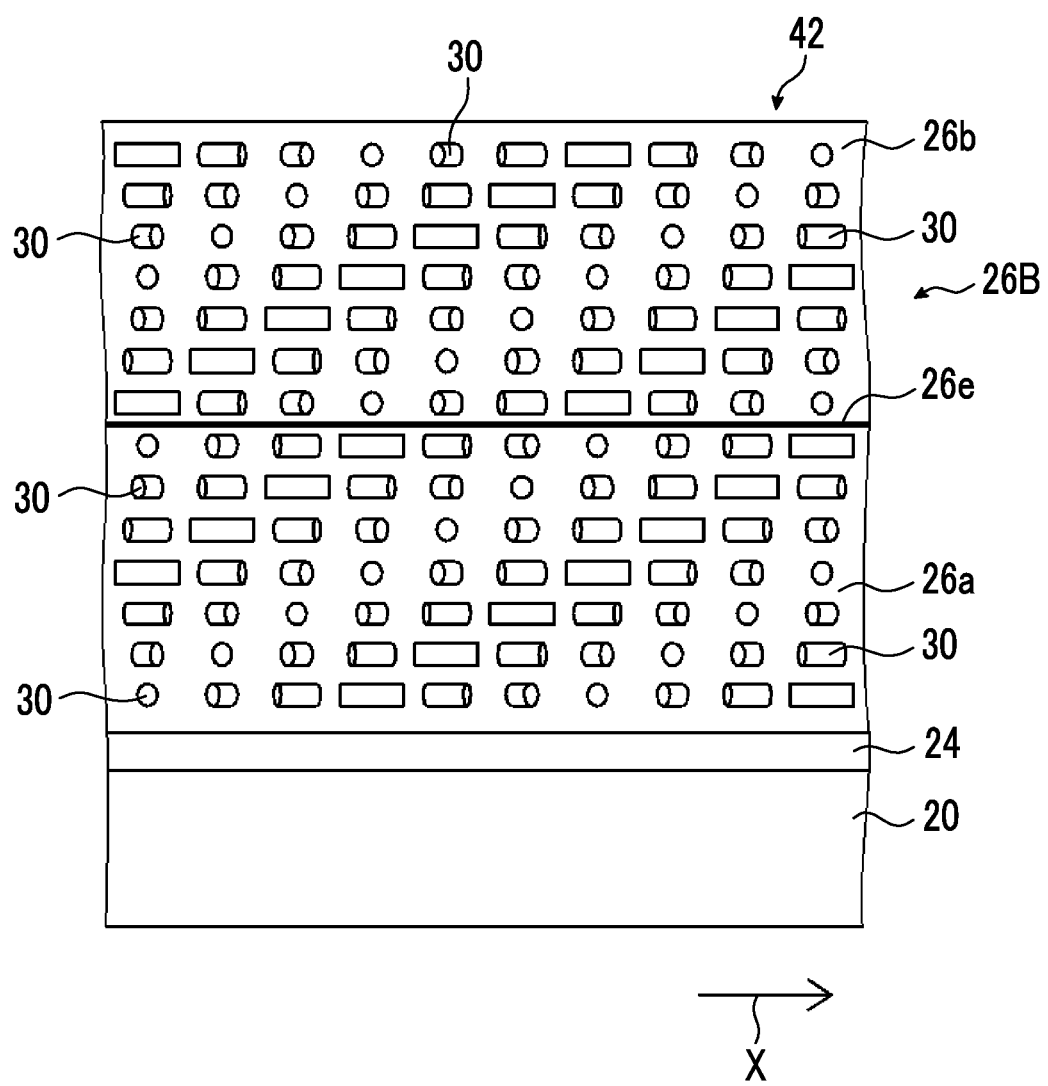
FIG. 9 is a diagram conceptually showing another example of the optical element according to the present invention.

FIG. 9 conceptually shows another example of the optical element according to the embodiment of the present invention.

Both the optical element 10 shown in FIG. 1 and the optical element 40 shown in FIG. 8 include the layered discontinuous portion provided between the first region 26a and the second region 26b. On the other hand, in an optical element 42 shown in FIG. 9, the helical twist of the liquid crystal compound 30 in the first region 26a and the second region 26b is discontinuous, and a discontinuous portion 26e is formed at an interface between the regions. That is, a defect portion where the twist of the liquid crystal compound 30 in the thickness direction is discontinuous is present between the first region 26a and the second region 26b.

Accordingly, with this configuration, the same effects as those of the optical element 10 shown in FIG. 1 where light reflected from the first region 26a and light reflected from the second region 26b interfere each other are exhibited. As a result, even in the optical element 42 shown in FIG. 9, in a case where the wavelength (wavelength range) at which the reflectivity rapidly decreases is generated in the selective reflection wavelength range of the cholesteric liquid crystal layer and the cholesteric liquid crystal layer receives an external stimulus, the wavelength at which the reflectivity rapidly decreases changes.

FIG. 12 conceptually shows a cross-sectional SEM image of the cholesteric liquid crystal layer 26B including the discontinuous portion 26e taken in the in-plane direction in which the optical axis 30A of the liquid crystal compound rotates. As shown in FIG. 12, the cholesteric liquid crystal layer 26B is in a state in which a portion where a bright line and a dark line tilted with respect to the thickness direction and the plane direction are shifted in the in-plane direction in which the optical axis 30A rotates in the discontinuous portion 26e provided between the first region 26a and the second region 26b is formed in the in-plane direction in which the optical axis 30A rotates.

In the cross-sectional SEM image of the cholesteric liquid crystal layer 26B including the discontinuous portion 26e taken in the in-plane direction in which the optical axis 30A of the liquid crystal compound rotates, so-called deviation occurs between the first region 26a and the second region 26b.

The cholesteric liquid crystal layer 26B including the discontinuous portion 26e can be prepared, for example, by preparing two films including a cholesteric liquid crystal layer, peeling the alignment film 24 and the support 20 of one of the films, and laminating and compressing the cholesteric liquid crystal layers, the cholesteric liquid crystal layers having the same liquid crystal alignment pattern in which the optical axis 30A rotates in the in-plane direction, the same single period in which the optical axis 30A rotates, and the same rotation direction of the optical axis 30A in the in-plane direction, and the same single pitch of the helical structure of the cholesteric liquid crystalline phase.

In the cholesteric liquid crystal layer 26B including the discontinuous portion 26e, in the liquid crystal compounds 30 facing each other in the thickness direction with respect to the discontinuous portion 26e, it is preferable that the directions of the optical axes 30A are different from each other. That is, in the cholesteric liquid crystal layer 26B including the discontinuous portion 26e, in the liquid crystal compounds 30 on the upper surface of the first region 26a and the lower surface of the second region 26b facing each other in the thickness direction with respect to the discontinuous portion 26e, it is preferable that the directions of the optical axes 30A are different from each other.

Specifically, in the liquid crystal compounds 30 on the upper surface of the first region 26a and the lower surface of the second region 26b facing each other in the thickness direction with respect to the discontinuous portion 26e, it is preferable that the optical axes 30A intersect each other by 45° to 90°, it is more preferable that the optical axes 30A intersect each other by 70° to 90°, and it is still preferable that the optical axes 30A intersect each other by 90°.

With the above-described configuration, the defect in which the twist of the liquid crystal compound 30 between the first region 26a and the second region 26b is discontinuous can be increased, the wavelength at which the reflectivity rapidly decreases can be suitably generated in the selective reflection wavelength range of the cholesteric liquid crystal layer, and the wavelength at which the reflectivity rapidly decreases can be changed depending external stimuli.

<Another Example of Liquid Crystal Alignment Pattern of Cholesteric Liquid Crystal Layer>

All of the above-described cholesteric liquid crystal layers have the liquid crystal alignment pattern in which the optical axis derived from the liquid crystal compound 30 rotates in the in-plane direction (arrow X direction).

However, in the optical element according to the embodiment of the present invention, the in-plane liquid crystal alignment pattern of the cholesteric liquid crystal layer is not limited to the above-described configuration. That is, in the optical element according to the embodiment of the present invention, the cholesteric liquid crystal layer may have a liquid crystal alignment pattern in which the optical axis derived from the liquid crystal compound 30 rotates in a plurality of directions.

Figure 13:
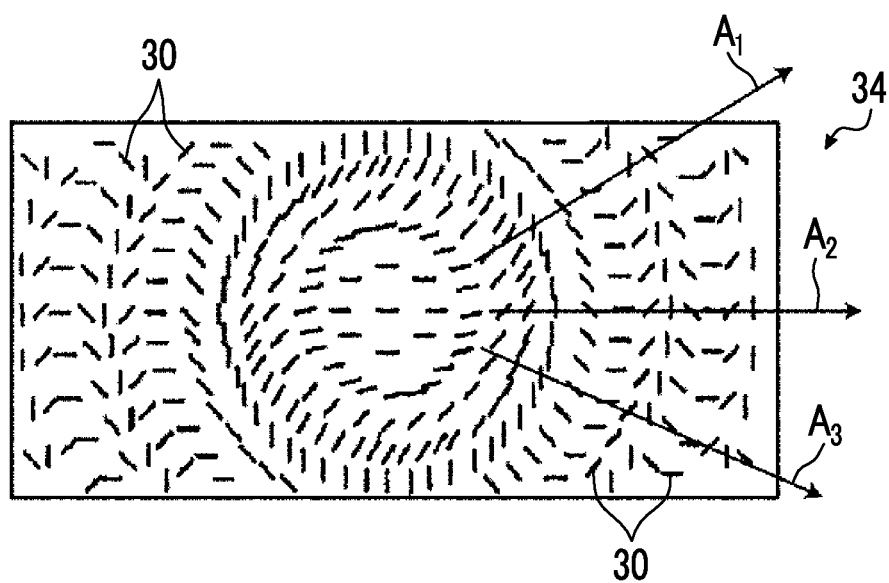
FIG. 13 is a plan view conceptually showing another example of the cholesteric liquid crystal layer used in the optical element according to the present invention.

For example, a cholesteric liquid crystal layer 34 (the first region and the second region) conceptually shown in a plan view of FIG. 13 can be used, in which a liquid crystal alignment pattern is a concentric circular pattern having a concentric circular shape where the in-plane direction in which the direction of the optical axis of the liquid crystal compound 30 changes while continuously rotating moves from an inside toward an outside.

Alternatively, a liquid crystal alignment pattern can also be used where the in-plane direction in which the direction of the optical axis of the liquid crystal compound 30 changes while continuously rotating is provided in a radial shape from the center of the cholesteric liquid crystal layer 34 instead of a concentric circular shape.

Figure 2:
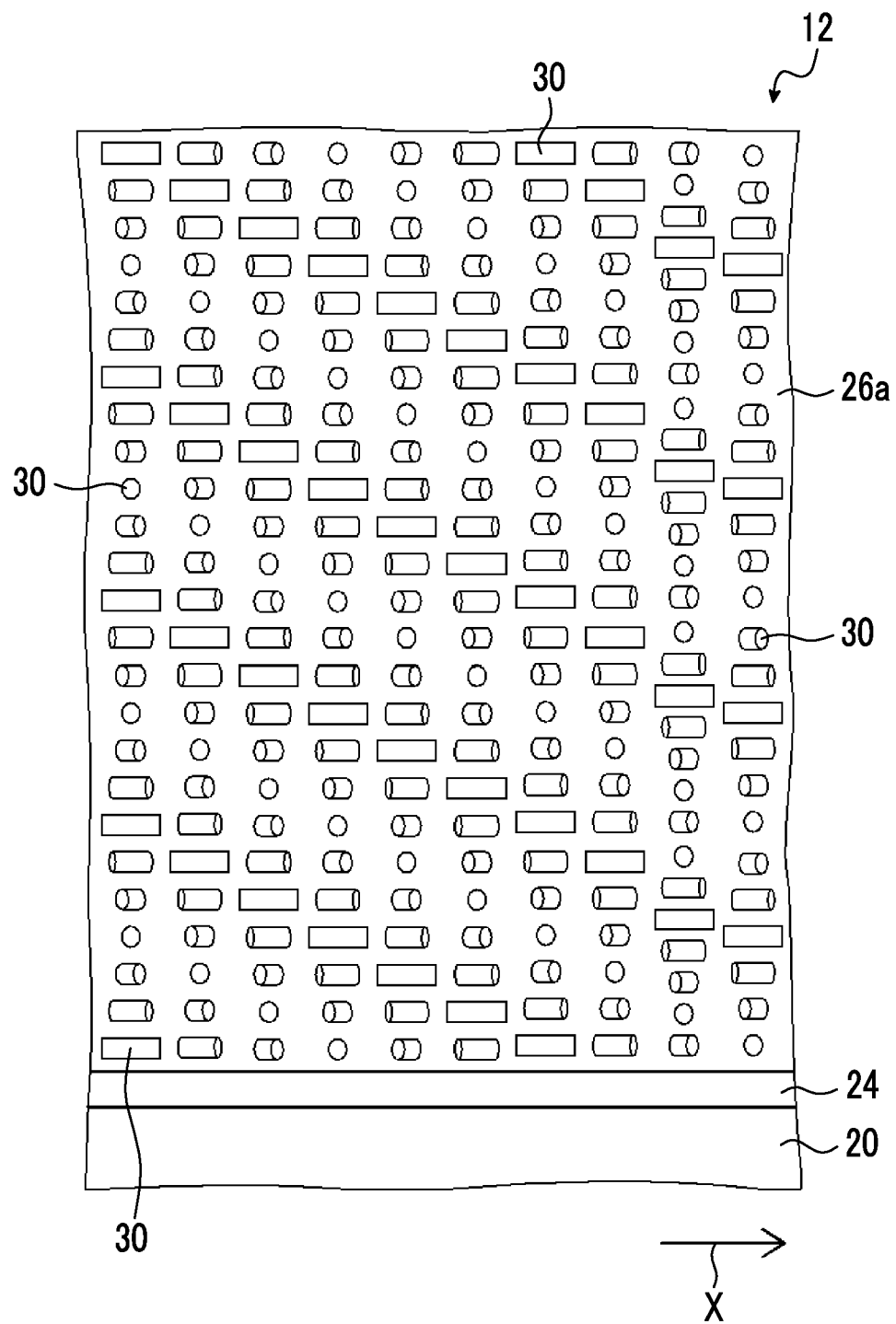
FIG. 2 is a conceptual diagram showing a cholesteric liquid crystal layer of the optical element shown in FIG. 1.

FIG. 13 shows only the liquid crystal compound 30 of the surface of the alignment film as in FIG. 3. However, as shown in FIG. 2, the cholesteric liquid crystal layer 34 has the helical structure in which the liquid crystal compound 30 on the surface of the alignment film is helically twisted and laminated as described above.

In the cholesteric liquid crystal layer 34 shown in FIG. 13, the optical axis (not shown) of the liquid crystal compound 30 is a longitudinal direction of the liquid crystal compound 30.

In the cholesteric liquid crystal layer 34, the direction of the optical axis of the liquid crystal compound 30 changes while continuously rotating in a direction in which a large number of optical axes move to the outside from the center of the cholesteric liquid crystal layer 34, for example, a direction indicated by an arrow $A_1$, a direction indicated by an arrow $A_2$, a direction indicated by an arrow $A_3$, or . . . .

In addition, as a preferable aspect, for example, the direction of the optical axis of the liquid crystal compound changes while rotating in a radial direction from the center of the cholesteric liquid crystal layer 34 as shown in FIG. 13. In the aspect shown in FIG. 13, counterclockwise alignment is shown. The rotation directions of the optical axes indicated by the respective arrows $A_1$, $A_2$, and $A_3$ in FIG. 13 are counterclockwise toward the outside from the center.

In circularly polarized light incident into the cholesteric liquid crystal layer 34 having the above-described liquid crystal alignment pattern, the absolute phase changes depending on individual local regions having different directions of optical axes of the liquid crystal compound 30. In this case, the amount of change in absolute phase varies depending on the directions of the optical axes of the liquid crystal compound 30 into which circularly polarized light is incident.

This way, in the cholesteric liquid crystal layer 34 having the concentric circular liquid crystal alignment pattern, that is, the liquid crystal alignment pattern in which the optical axis changes while continuously rotating in a radial shape, incidence light can be reflected as diverging light or converging light depending on the rotation direction of the optical axis of the liquid crystal compound 30 and the direction of circularly polarized light to be reflected.

That is, by setting the liquid crystal alignment pattern of the cholesteric liquid crystal layer in a concentric circular shape, the optical element according to the embodiment of the present invention exhibits, for example, a function as a concave mirror or a convex mirror.

<Sensor>

FIG. 14 conceptually shows an example of a sensor according to the embodiment of the present invention including the optical element according to the embodiment of the present invention.

In FIG. 14, the optical element 10 shown in FIG. 1 is used as the optical element according to the embodiment of the present invention. However, the same effects can be obtained even in a case where the optical element 40 shown in FIG. 8 or the optical element 42 shown in FIG. 9 is used instead of the optical element 10 and in a case where an optical element including a cholesteric liquid crystal layer having the liquid crystal alignment pattern shown in FIG. 13 is used.

A sensor 50 shown in FIG. 14 includes a light source 52, the optical element 10 according to the embodiment of the present invention, and a photodetector 54.

In the sensor 50, light emitted from the light source 52 is reflected from the optical element 10, and this reflected light is detected by the photodetector 54. As a result, a stimulus received by the optical element 10 is detected.

As the light source 52, various well-known light sources can be used as long as they can emit at least light at the wavelength at which the reflectivity rapidly decreases in the selective reflection wavelength range of the cholesteric liquid crystal layer 26 of the optical element 10 and preferably light in a wavelength range including the selective reflection wavelength range of the cholesteric liquid crystal layer 26. Examples of the light source include an electric lamp such as a mercury lamp, a fluorescent lamp, a halogen lamp, a light emitting diode (LED), and a laser such as a semiconductor laser. The light emitted from the light source 52 may be either diffused light or parallel light such as a collimated light beam.

In the sensor according to the embodiment of the present invention, in a case where, for example, ambient light such as illumination in a place where the sensor is provided can be used as the light source, the light source 52 is not necessarily provided.

As the photodetector 54, various well-known photodetectors can be used as long as they can receive and measure light emitted from the light source 52 and reflected from the optical element 10. Examples of the photodetector include a complementary metal oxide semiconductor (CMOS) sensor and a charge coupled device (CCD) sensor.

In order to suitably detect an output variation of a pixel corresponding to a stimulus on the optical element 10, it is preferable that the photodetector 54 is a photodetector (line sensor) that detects light in a line shape or a photodetector (area sensor) that two-dimensionally detects light.

<Action of Sensor>

In the sensor 50, light emitted from the light source 52 is reflected from the optical element 10, and this reflected light is detected by the photodetector 54.

In the example shown in the drawing, light emitted from the light source 52 is incident from the normal direction into the main surface (maximum surface) of the cholesteric liquid crystal layer 26 of the optical element 10.

As described above, the light is reflected from the optical element 10 in a state where the light is tilted in the in-plane direction (arrow X) in which the optical axis 30A rotates with respect to specular reflection. Accordingly, the light is reflected from the optical element 10 in a state where the light is tilted in the arrow X direction with respect to the normal direction.

Here, the reflection angle (diffraction angle) of light from the optical element 10 varies depending on wavelengths. As the wavelength increases, the reflection angle increases.

For example, light at a wavelength in the selective reflection wavelength range of the cholesteric liquid crystal layer 26 is incident into a pixel at a position a of the photodetector 54, light at a longer wavelength is incident into a pixel at a position b of the photodetector 54 corresponding to a larger reflection angle, and light at a much longer wavelength is incident into a pixel at a position c of the photodetector 54 corresponding to a much larger reflection angle, and light at a still much longer wavelength is incident into a pixel at a position d of the photodetector 54 corresponding to a still much larger reflection angle.

Here, in the cholesteric liquid crystal layer 26 of the optical element 10, it is assumed that the wavelength at which the reflectivity rapidly decreases in the selective reflection wavelength range is the wavelength of the light incident into the pixel at the position b according to the reflection angle corresponding to the wavelength. In this case, the output of the pixel at the position b is significantly lower than those at the positions a, c, and d.

In a case where the optical element 10 receives a stimulus S in this state, as described above, the wavelength at which the reflectivity rapidly decreases in the selective reflection wavelength range moves to a longer wavelength side. Accordingly, the wavelength at which the reflectivity rapidly decreases is a wavelength at which the reflection angle (diffraction angle) corresponding to the wavelength is great.

Therefore, in a state where the optical element 10 receives the stimulus S, the light at the wavelength incident into the pixel at the position b is reflected from the optical element 10 (the cholesteric liquid crystal layer 26). Therefore, the output of the pixel at the position b rapidly increases. In addition, the output rapidly decreases according to the pixel into which the light having a longer wavelength is incident and the wavelength at which the reflectivity rapidly decreases. For example, the output of the pixel at the position d into which the light having a longer wavelength is incident rapidly decreases.

That is, in the sensor 50 according to the embodiment of the present invention, by detecting a change in the intensity of the output of the pixel at the position b corresponding to the reflection at the wavelength at which the reflectivity rapidly decreases in the photodetector 54, a stimulus received by the optical element 10 can be detected with high sensitivity.

In addition, the size of the stimulus can also be detected based on the position of the pixel where the output decreases according to the stimulus S.

The stimulus S detected in the sensor 50 according to the embodiment of the present invention is not limited.

Examples of the stimulus S include a mechanical stimulus (for example, a stress sensor) such as stress generated by pressing, bending, or the like, an optical stimulus (for example, an optical sensor) generated using a material such as a photochromic material in which the state changes by receiving light, a chemical stimulus (for example, a material sensor) generated using a material where the state changes due to a chemical reaction by coming into contact with a specific material, and an electrical stimulus (for example, an electrical sensor) generated by a change in a voltage, a current, power, or the like.

The sensor 50 according to the embodiment of the present invention may detect a plurality of stimuli.

Hereinabove, the optical element and the sensor according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

(Support and Saponification Treatment of Support)

As the support, a commercially available triacetyl cellulose film (manufactured by Fujifilm Corporation, Z-TAC) was prepared.

The support was caused to pass through a dielectric heating roll at a temperature of 60° C. such that the support surface temperature was increased to 40° C. Next, an alkali solution shown below was applied to a single surface of the support using a bar coater in an application amount of 14 mL (liter)/m$^2$, the support was heated to 110° C., and the support was transported for 10 seconds under a steam far infrared electric heater (manufactured by Noritake Co., Ltd.).

Next, 3 mL/m$^2$ of pure water was applied to a surface of the support to which the alkali solution was applied using the same bar coater. Next, water cleaning using a foundry coater and water draining using an air knife were repeated three times, and then the support was transported and dried in a drying zone at 70° C. for 10 seconds. As a result, the alkali saponification treatment was performed on the surface of the support.

| Alkali Solution | |
|---|---|
| Potassium hydroxide | 4.70 parts by mass |
| Water | 15.80 parts by mass |
| Isopropanol | 63.70 parts by mass |
| Surfactant SF-1: $C_{14}H_{29}O(CH_2CH_2O)_2OH$ | 1.0 part by mass |
| Propylene glycol | 14.8 parts by mass |

(Formation of Undercoat Layer)

The following undercoat layer-forming coating solution was continuously applied to the surface of the support on which the alkali saponification treatment was performed using a #8 wire bar. The support on which the coating film was formed was dried using warm air at 60° C. for 60 seconds and was dried using warm air at 100° C. for 120 seconds. As a result, an undercoat layer was formed.

| Undercoat Layer-Forming Coating Solution | |
|---|---|
| The following modified polyvinyl alcohol | 2.40 parts by mass |
| Isopropyl alcohol | 1.60 parts by mass |
| Methanol | 36.00 parts by mass |
| Water | 60.00 parts by mass |

Modifieid Polyvinyl Alcohol

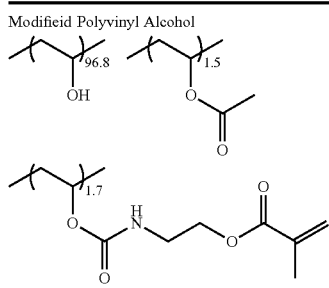

(Formation of Alignment Film)

The following alignment film-forming coating solution was continuously applied to the support on which the undercoat layer was formed using a #2 wire bar. The support on which the coating film of the alignment film-forming coating solution was formed was dried using a hot plate at 60° C. for 60 seconds. As a result, an alignment film was formed.

| Alignment Film-Forming Coating Solution | |
|---|---|
| Material A for photo-alignment | 1.00 part by mass |
| Water | 16.00 parts by mass |
| Butoxyethanol | 42.00 parts by mass |
| Propylene glycol monomethyl ether | 42.00 parts by mass |

Material A for Photo-Alignment- (Exposure of Alignment Film)

The alignment film was exposed using the exposure device shown in FIG. 5 to form an alignment film P-1 having an alignment pattern.

In the exposure device, a laser that emits laser light having a wavelength (325 nm) was used as the laser. The exposure dose of the coherent light was 100 mJ/cm². The single period (the length over which the optical axis derived from the liquid crystal compound rotates by 180°) of an alignment pattern formed by interference of two laser beams was controlled by changing an intersecting angle (intersecting angle α) between the two beams.

(Formation of Cholesteric Liquid Crystal Layer)

<Formation of First Region>

As the liquid crystal composition forming the first region of the cholesteric liquid crystal layer, the following composition A-1 was prepared. This composition A-1 is a liquid crystal composition forming a cholesteric liquid crystal layer (cholesteric liquid crystalline phase) that has a selective reflection center wavelength of 550 nm and reflects right circularly polarized light.

| Composition A-1 | |
|---|---|
| Rod-shaped liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Chiral agent Ch-1 | 5.46 parts by mass |
| Leveling agent T-1 | 0.08 parts by mass |
| Methyl ethyl ketone | 268.20 parts by mass |

Rod-shaped liquid crystal compound L-1

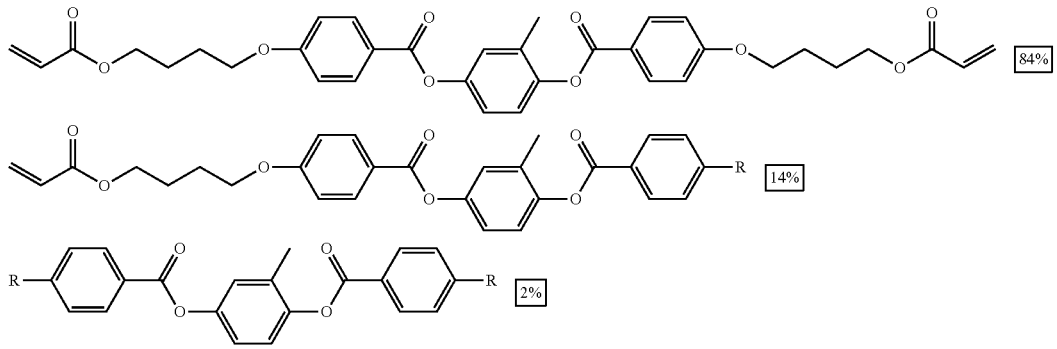

| Composition A-1 |
| --- |

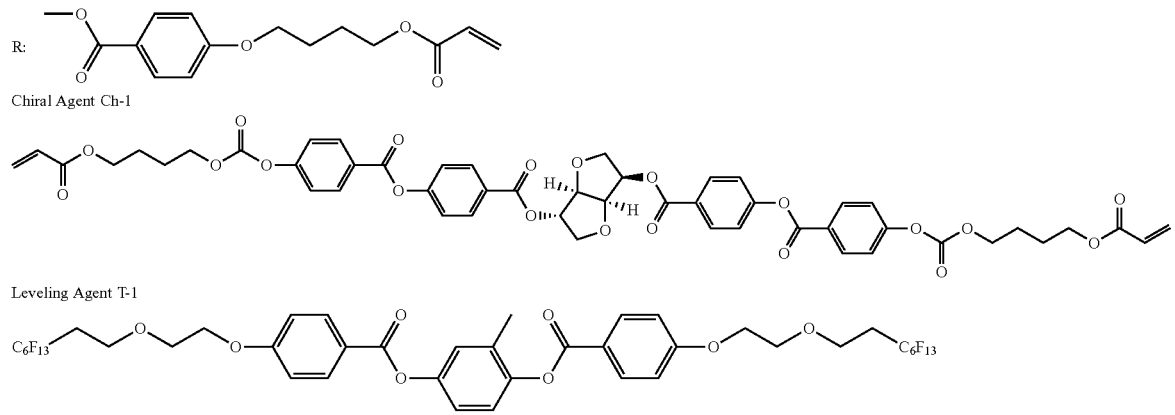

Chiral Agent Ch-1

Leveling Agent T-1

The first region was formed by applying multiple layers of the composition A-1 to the alignment film P-1.

The application of the multiple layers refers to repetition of the following processes including: preparing a first liquid crystal immobilized layer by applying the first layer-forming composition A-1 to the alignment film, heating the composition A-1, cooling the composition A-1, and irradiating the composition A-1 with ultraviolet light for curing; and preparing a second or subsequent liquid crystal immobilized layer by applying the second or subsequent layer-forming composition A-1 to the formed liquid crystal immobilized layer, heating the composition A-1, cooling the composition A-1, and irradiating the composition A-1 with ultraviolet light for curing as described above. Even in a case where the liquid crystal layer was formed by the application of the multiple layers such that the total thickness of the liquid crystal layer was large, the alignment direction of the alignment film was reflected from a lower surface of the liquid crystal layer to an upper surface thereof.

Regarding the first liquid crystal layer, the composition A-1 was applied to the alignment film P-1 to form a coating film, the coating film was heated using a hot plate at 95° C., the coating film was cooled to 25° C., and the coating film was irradiated with ultraviolet light having a wavelength of 365 nm at an irradiation dose of 100 mJ/cm² using a high-pressure mercury lamp in a nitrogen atmosphere. As a result, the alignment of the liquid crystal compound was immobilized. In this case, the thickness of the first liquid crystal layer was 0.2 μm.

Regarding the second or subsequent liquid crystal layer, the composition was applied to the first liquid crystal layer, and the applied composition was heated, cooled, and irradiated with ultraviolet light for curing under the same conditions as described above. As a result, a liquid crystal immobilized layer was prepared. This way, by repeating the application multiple times until the total thickness reached 2.2 μm, and the first region of the cholesteric liquid crystal layer was formed.

In a case where a cross-section of the first region was observed with a SEM, the cholesteric liquid crystalline phase had 6 pitches. In addition, it was verified with a polarizing microscope that a periodic liquid crystal alignment pattern was formed on the surface of the first region. In the liquid crystal alignment pattern, the single period over which the optical axis derived from the liquid crystal compound rotated by 180° was 0.8 μm.

<Formation of Discontinuous Portion>

As the liquid crystal composition forming the discontinuous portion of the cholesteric liquid crystal layer, the following composition A-2 was prepared. The composition A-2 is a liquid crystal composition for forming an anisotropic layer that is not twisted.

| Composition A-2 | |
| --- | --- |
| Rod-shaped liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 268.20 parts by mass |

The discontinuous portion of the cholesteric liquid crystal layer was formed by applying multiple layers of the composition A-2 to the first region. The alignment direction of the liquid crystal compound in the discontinuous portion is the same as the alignment direction on the uppermost surface of the first region as the lower layer.

After the application of A-2, the coating film was heated to 95° C. using a hot plate and then was cooled to 25° C.

Next, the coating film was irradiated with ultraviolet light having a wavelength of 365 nm at an irradiation dose of 100 mJ/cm² using a high-pressure mercury lamp in a nitrogen atmosphere. As a result, the alignment of the liquid crystal compound was immobilized, and the discontinuous portion (anisotropic layer) was formed. The thickness of the discontinuous portion was 90 nm.

<Formation of Second Region>

As the liquid crystal composition forming the second region of the cholesteric liquid crystal layer, the above-described composition A-1 was used.

The second region was formed by applying multiple layers of the composition A-1 to the discontinuous portion. In addition, the formation method is the same as that of the first region. The thickness of the second region was 2.2 and the number of pitches thereof was 6.

Hereinabove, a cholesteric liquid crystal layer in which the first region, the discontinuous portion, and the second region were laminated was prepared, and an optical element including a support, an alignment film, and the cholesteric liquid crystal layer was prepared.

(Cross-Section of Cholesteric Liquid Crystal Layer)

In a case where a cross-section of the cholesteric liquid crystal layer was observed with a scanning electron microscope (SEM), a structure in which a portion where a bright line and a dark line derived from a cholesteric liquid crystalline phase were discontinuous as shown in FIG. 10 was formed in an in-plane direction in which a direction of an optical axis rotates was observed.

In addition, in a case where images excluding the discontinuous portion were connected during the SEM observation, the bright line and the dark line were continuously connected. It was verified from the above result that, in liquid crystal compounds facing each other in the thickness direction with respect to the portion where the bright line and the dark line were discontinuous, directions of optical axes derived from the liquid crystal compounds were the same.

Further, the first region and the second region in the prepared cholesteric liquid crystal layer were peeled off from each other, and a helical twisted direction and a selective reflection center wavelength of each of the regions was verified. As a result, in both the regions, the twisted direction was right, and the selective reflection center wavelength was 550 nm.

(Evaluation)

Reflection properties of the optical element (cholesteric liquid crystal layer) were measured using a reflectance spectrophotometer.

Light is reflected in an oblique direction at about 45° with respect to incidence light from the vertical direction, and a sharp valley of the reflected light at a wavelength in the vicinity of 550 nm was obtained as shown in FIG. 7. In addition, at an reflection angle corresponding to the wavelength of the sharp valley, reflected light was weak, light having a longer wavelength was split at a larger angle, light having a shorter wavelength was split at a smaller angle, and both the light components are strongly reflected.

By receiving the light with an image sensor, the amount of the reflected light rapidly decreased at a position (pixel) corresponding to the valley of the reflected light. In addition, in a case where a weak tensile stress was applied to the optical element, the position where the amount of the reflected light rapidly decreased was changed to another pixel. That is, it was verified that the wavelength corresponding to the valley of the reflected light, that is, the reflection angle corresponding to the valley where the amount of the reflected light rapidly decreased was changed by the stimulus.

Example 2

By changing the intersecting angle (intersecting angle α) of two light components during the exposure of the alignment film in the preparation of the optical element according to Example 1, the single period over which the optical axis derived from the liquid crystal compound rotated by 180° was changed to 0.45 µm.

Using the same method as that of Example 1 except for the above-described configuration, an optical element including a support, an alignment film, and the cholesteric liquid crystal layer was prepared.

Using the same method as that of Example 1, a cross-section of the cholesteric liquid crystal layer was observed with a SEM. As a result, a structure in which a portion where a bright line and a dark line derived from a cholesteric liquid crystalline phase are discontinuous as shown in FIG. 10 was formed in an in-plane direction in which a direction of an optical axis rotates was observed.

In addition, in a case where images excluding the discontinuous portion were connected during the SEM observation, the bright line and the dark line were continuously connected. It was verified from the above result that, in liquid crystal compounds facing each other in the thickness direction with respect to the portion where the bright line and the dark line were discontinuous, directions of optical axes derived from the liquid crystal compounds were the same.

Further, the first region and the second region in the prepared cholesteric liquid crystal layer were peeled off from each other, and a helical twisted direction and a selective reflection center wavelength of each of the regions was verified. As a result, in both the regions, the twisted direction was right, and the selective reflection center wavelength was 550 nm.

Next, the prepared optical element was attached to an end portion of a main surface of a light guide plate having a refractive index of 1.5.

In a case where measurement light was caused to be vertically incident from a surface of the light guide plate opposite to the surface where the optical element was attached, a state where light reflected from the optical element (cholesteric liquid crystal layer) propagated in the light guide plate was observed. A wavelength range of the reflected light includes a non-reflection wavelength corresponding to the defect layer. In addition, with this configuration, information regarding the non-reflection wavelength was able to be transmitted to a distant position through the light guide plate (light guide).

Further, by forming a shape in which an end of the light guide plate was obliquely cut at a position distant from the optical element, the reflected light propagated in the light guide plate was extracted to the outside of the light guide plate.

Properties of the reflected light extracted to the outside of the light guide plate were measured with the same method as that of Example 1 using a reflectance spectrophotometer. In addition, the reflected light extracted to the outside of the light guide plate was received by an image sensor using the same method as that of Example 1, and a tensile stress was applied to the optical element using the same method as that of Example 1.

The obtained results were the same as those of Example 1.

It was verified from the above-described results that the optical element according to the embodiment of the present invention can be suitably used for a partial variation in the amount of reflected light depending on whether or not a stimulus is applied to a sensor.

The present invention is suitably applicable to various applications using a partial variation in the amount of reflected light depending on whether or not a stimulus is applied, for example, a sensor that detects a mechanical stimulus, a chemical stimulus, an optical stimulus, or an electrical stimulus.

EXPLANATION OF REFERENCES

10, 40, 42: optical element
20: support
24: alignment film
26, 34: cholesteric liquid crystal layer 26a: first region
26b: second region
26c, 26d, 26e: discontinuous portion
30: liquid crystal compound
30A: optical axis
50: sensor
52: light source
54: photodetector
60: exposure device
62: laser
64: light source
68: polarization beam splitter
70A, 70B: mirror
72A, 72B: λ/4 plate
E: equiphase surface
M: laser light
MA, MB: beam
$P_O$: linearly polarized light
$P_R$, R: right circularly polarized light
$P_L$: left circularly polarized light
Q: absolute phase
S: stimulus

What is claimed is:

1. An optical element comprising:
a cholesteric liquid crystal layer that is obtained by immobilizing a cholesteric liquid crystalline phase,
wherein the cholesteric liquid crystal layer has a liquid crystal alignment pattern in which a direction of an optical axis derived from a liquid crystal compound changes while continuously rotating in at least one in-plane direction,
in a cross-sectional view obtained by observing, using a scanning electron microscope, a cross-section taken in a thickness direction conforming the in-plane direction in which the direction of the optical axis rotates, a portion where a bright line and a dark line derived from the cholesteric liquid crystalline phase are discontinuous is provided in the cholesteric liquid crystal layer in the in-plane direction in which the direction of the optical axis rotates, and
in a case where, in the liquid crystal alignment pattern, a length over which the direction of the optical axis derived from the liquid crystal compound rotates by 180° in the in-plane direction in which the direction of the optical axis changes while continuously rotating is set as a single period, areas sandwiching the portion where a bright line and a dark line derived from the cholesteric liquid crystalline phase are discontinuous have a same length of the single period in the liquid crystal alignment pattern.

2. The optical element according to claim 1,
wherein a portion where angles of the bright line and the dark line are different is provided as the portion where the bright line and the dark line are discontinuous.

3. The optical element according to claim 2,
wherein in the portion where the bright line and the dark line are discontinuous, the bright line and the dark line are directed to the thickness direction of the cholesteric liquid crystal layer.

4. The optical element according to claim 2,
wherein in liquid crystal compounds facing each other in the thickness direction with respect to the portion where the bright line and the dark line are discontinuous, directions of optical axes derived from the liquid crystal compounds are the same.

5. The optical element according to claim 3,
wherein in liquid crystal compounds facing each other in the thickness direction with respect to the portion where the bright line and the dark line are discontinuous, directions of optical axes derived from the liquid crystal compounds are the same.

6. The optical element according to claim 1,
wherein a portion where the bright line and the dark line are disconnected is provided as the portion where the bright line and the dark line are discontinuous.

7. The optical element according to claim 1,
wherein a portion where the bright line and the dark line are shifted in the in-plane direction in which the direction of the optical axis rotates is provided as the portion where the bright line and the dark line are discontinuous.

8. The optical element according to claim 7,
wherein in liquid crystal compounds facing each other in the thickness direction with respect to the portion where the bright line and the dark line are discontinuous, directions of optical axes derived from the liquid crystal compounds are different from each other.

9. The optical element according to claim 8,
wherein in the liquid crystal compounds facing each other in the thickness direction with respect to the portion where the bright line and the dark line are discontinuous, an angle between the optical axes derived from the liquid crystal compounds is 70° to 90°.

10. The optical element according to claim 1,
wherein in a selective reflection wavelength range of the cholesteric liquid crystal layer, in a case where a wavelength having a lowest reflectivity is represented by λm, a thickness of the portion where the bright line and the dark line are discontinuous is in the following range, 30×(λm/550) to 150×(λm/550).

11. A sensor comprising:
the optical element according to claim 1; and
a photodetector that detects light reflected from the optical element.

12. The sensor according to claim 11, further comprising:
a light source that emits light capable of being reflected from the optical element,
wherein the photodetector detects light emitted from the light source and reflected from the optical element.

13. The sensor according to claim 11,
wherein the photodetector is a photodetector that detects light in a line shape or a photodetector that two-dimensionally detects light.

14. The sensor according to claim 11,
wherein a stimulus received by the optical element is detected.

15. The sensor according to claim 14,
wherein at least one of a mechanical stimulus, an optical stimulus, a chemical stimulus, or an electrical stimulus is detected as the stimulus received by the optical element.

* * * * *